(12) United States Patent
Maufer et al.

(10) Patent No.: US 7,620,070 B1
(45) Date of Patent: Nov. 17, 2009

(54) PACKET PROCESSING WITH RE-INSERTION INTO NETWORK INTERFACE CIRCUITRY

(75) Inventors: Thomas A. Maufer, Menlo Park, CA (US); Paul J. Gyugyi, Sunnyvale, CA (US); Sameer Nanda, San Jose, CA (US); Paul J. Sidenblad, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 876 days.

(21) Appl. No.: 10/603,792

(22) Filed: Jun. 24, 2003

(51) Int. Cl.
*H04J 3/24* (2006.01)
(52) U.S. Cl. .................. 370/474; 370/473; 714/746
(58) Field of Classification Search .................. 714/712; 370/412
See application file for complete search history.

(56) References Cited

U.S. PATENT DOCUMENTS

| | | | |
|---|---|---|---|
| 5,524,250 | A | 6/1996 | Chesson et al. |
| 5,742,773 | A | 4/1998 | Blomfield-Brown et al. |
| 5,826,027 | A | 10/1998 | Pedersen et al. |
| 5,884,025 | A | 3/1999 | Baehr et al. |
| 6,032,253 | A | 2/2000 | Cashman et al. |
| 6,034,963 | A | 3/2000 | Minami et al. |
| 6,047,325 | A | 4/2000 | Jain et al. |
| 6,055,236 | A | 4/2000 | Nessett et al. |
| 6,094,485 | A | 7/2000 | Weinstein et al. |
| 6,101,170 | A | 8/2000 | Doherty et al. |
| 6,157,955 | A | 12/2000 | Narad et al. |
| 6,189,102 | B1 | 2/2001 | Beser |
| 6,266,707 | B1 | 7/2001 | Boden et al. |
| 6,301,669 | B2 | 10/2001 | Boden et al. |
| 6,327,660 | B1 | 12/2001 | Patel |
| 6,389,419 | B1 | 5/2002 | Wong et al. |
| 6,401,117 | B1 | 6/2002 | Narad et al. |
| 6,421,730 | B1 | 7/2002 | Narad et al. |
| 6,424,650 | B1 * | 7/2002 | Yang et al. .................. 370/390 |
| 6,426,943 | B1 * | 7/2002 | Spinney et al. .............. 370/235 |
| 6,483,804 | B1 * | 11/2002 | Muller et al. ............... 370/230 |
| 6,496,867 | B1 | 12/2002 | Beser et al. |
| 6,542,935 | B1 | 4/2003 | Ishii |

(Continued)

FOREIGN PATENT DOCUMENTS

EP    1 130 846    9/2001

(Continued)

OTHER PUBLICATIONS

Stevens, W. Richard, TCP/IP Illustrated vol. 1, 1994, Addison Wesley, p. 1.c, 231,252.

(Continued)

*Primary Examiner*—Michael J Moore, Jr.
(74) *Attorney, Agent, or Firm*—Patterson & Sheridan, LLP

(57) ABSTRACT

Method and apparatus for packet processing by re-insertion into network interface circuitry. A method for handling a burst of packets sent to network interface circuitry includes checking for a connection table entry for received packets, and responsive to non-existence of the connection table entry for the received packets, sending the packets to network interface software for processing. The network interface software processing includes: building the connection table entry; processing the packets; and sending the packets as processed to the network interface circuitry. Additionally, a method for re-inserting a packet responsive to an active audit mode is described.

20 Claims, 25 Drawing Sheets

U.S. PATENT DOCUMENTS

| | | | |
|---|---|---|---|
| 6,542,992 B1 | 4/2003 | Peirce et al. | |
| 6,560,196 B1 * | 5/2003 | Wei | 370/230.1 |
| 6,611,525 B1 * | 8/2003 | Natanson et al. | 370/395.53 |
| 6,615,357 B1 | 9/2003 | Boden et al. | |
| 6,646,999 B1 | 11/2003 | Kato et al. | |
| 6,704,794 B1 | 3/2004 | Kejriwal et al. | |
| 6,714,985 B1 * | 3/2004 | Malagrino et al. | 709/236 |
| 6,735,647 B2 | 5/2004 | Boyd et al. | |
| 6,757,746 B2 | 6/2004 | Boucher et al. | |
| 6,768,726 B2 | 7/2004 | Dorenbosch et al. | |
| 6,775,293 B1 * | 8/2004 | Robotham et al. | 370/412 |
| 6,779,033 B1 | 8/2004 | Watson et al. | |
| 6,781,955 B2 | 8/2004 | Leung | |
| 6,789,203 B1 | 9/2004 | Belissent | |
| 6,832,261 B1 | 12/2004 | Westbrook et al. | |
| 6,888,835 B2 | 5/2005 | Reeve | |
| 6,907,042 B1 | 6/2005 | Oguchi | |
| 6,912,522 B2 | 6/2005 | Edgar | |
| 6,944,706 B2 | 9/2005 | Schain et al. | |
| 6,950,862 B1 | 9/2005 | Puthiyandyil et al. | |
| 6,957,346 B1 | 10/2005 | Kivinen et al. | |
| 7,000,838 B2 * | 2/2006 | Lapinski et al. | 235/462.12 |
| 7,010,727 B1 | 3/2006 | Stucker | |
| 7,017,175 B2 | 3/2006 | Alao et al. | |
| 7,027,443 B2 | 4/2006 | Nichols et al. | |
| 7,043,759 B2 | 5/2006 | Kaashoek et al. | |
| 7,050,437 B2 * | 5/2006 | Bilic et al. | 370/394 |
| 7,116,640 B2 | 10/2006 | Tasman et al. | |
| 7,136,926 B1 | 11/2006 | Iyer et al. | |
| 7,149,222 B2 | 12/2006 | Wiryaman et al. | |
| 7,158,528 B2 * | 1/2007 | Dell et al. | 370/416 |
| 7,177,310 B2 | 2/2007 | Inagaki et al. | |
| 7,203,170 B2 * | 4/2007 | Dooley | 370/235 |
| 7,266,604 B1 | 9/2007 | Nathan et al. | |
| 2001/0000193 A1 | 4/2001 | Boden et al. | |
| 2001/0042200 A1 | 11/2001 | Lamberton et al. | |
| 2002/0009083 A1 | 1/2002 | Ambe et al. | |
| 2002/0035699 A1 | 3/2002 | Crosbie | |
| 2002/0046348 A1 | 4/2002 | Brustoloni | |
| 2002/0083344 A1 | 6/2002 | Vairavan | |
| 2002/0087935 A1 * | 7/2002 | Evans et al. | 714/799 |
| 2002/0103916 A1 | 8/2002 | Chen et al. | |
| 2002/0112076 A1 | 8/2002 | Rueda et al. | |
| 2002/0133534 A1 | 9/2002 | Forslow | |
| 2002/0136210 A1 | 9/2002 | Boden et al. | |
| 2002/0141389 A1 | 10/2002 | Fangman et al. | |
| 2002/0162026 A1 | 10/2002 | Neuman et al. | |
| 2003/0005103 A1 | 1/2003 | Narad et al. | |
| 2003/0007486 A1 | 1/2003 | March et al. | |
| 2003/0023712 A1 | 1/2003 | Zhao et al. | |
| 2003/0037164 A1 | 2/2003 | Chaar et al. | |
| 2003/0046423 A1 | 3/2003 | Narad et al. | |
| 2003/0061332 A1 | 3/2003 | Narad et al. | |
| 2003/0142823 A1 | 7/2003 | Swander et al. | |
| 2003/0145226 A1 | 7/2003 | Bruton, III et al. | |
| 2003/0154399 A1 | 8/2003 | Zuk et al. | |
| 2003/0177384 A1 | 9/2003 | Jones et al. | |
| 2003/0233568 A1 | 12/2003 | Maufer et al. | |
| 2003/0233576 A1 | 12/2003 | Maufer et al. | |
| 2004/0013112 A1 | 1/2004 | Goldberg et al. | |
| 2004/0015721 A1 | 1/2004 | Eastlake, III | |
| 2004/0030927 A1 | 2/2004 | Zuk et al. | |
| 2004/0114589 A1 | 6/2004 | Alfieri et al. | |
| 2004/0143655 A1 | 7/2004 | Narad et al. | |
| 2004/0148382 A1 | 7/2004 | Narad et al. | |
| 2004/0187032 A1 | 9/2004 | Gels et al. | |
| 2005/0281288 A1 | 12/2005 | Banerjee et al. | |

FOREIGN PATENT DOCUMENTS

| | | |
|---|---|---|
| WO | WO 99/35799 | 7/1999 |
| WO | WO 9966680 | 12/1999 |
| WO | WO 00/56034 | 9/2000 |
| WO | WO 01/67258 | 9/2001 |
| WO | WO 01/76258 | 10/2001 |
| WO | WO 02/059757 | 8/2002 |

OTHER PUBLICATIONS

Omondi, Amos R. et al., "Performance of a context cache for a multithreaded pipeline," *Journal Of Systems Architecture*, Elsevier Science Publishers B.V., Dec. 1, 1998, vol. 45, No. 4 pp. 305-322.

Smith, Richard E., "Internet-Kryptographie," Addison Wesley Longman, Inc., XP002295926, 1998.

Mogul et al., "Path MTU Discovery", pp. 1-19, RFC 1191, Stanford University, Nov. 1990.

Information Sciences Institute, University of Southern California, Marina del Rey, CA, USA, Sep. 1981: "Internet Protocol", RFC 791, Protocol Specification for the Defense Advanced Research Projects Agency (DARPA).

Orda et al., "Optimal Packet Fragmentation in Computer Networks", Israel Institute of Technology, Haifa, Israel, Mar. 1994.

Ito et al., "A Multiprocessor Approach for Meeting the Processing Requirements of OSI," IEEE Journal on Selected Areas in Communication vol. 11, No. 2, Feb. 1993.

US 6,447,647, 09/2002, Colby et al. (withdrawn)

* cited by examiner

CT
600

| ART INDEX 601 | REMOTE IP ADDR 602 | SPI/CALL ID 603 | LOCAL IP ADDR 604 | REMOTE PORT 605 | NT INDEX 606 | LOCAL PORT 607 | IP PROTOCOL 608 | TCP STATE 609 | SEQ. NO. 610 |
|---|---|---|---|---|---|---|---|---|---|

| ART INDEX 601 | REMOTE IP ADDR 602 | SPI/CALL ID 603 | PUBLIC IP ADDR 704 | REMOTE PORT 605 | CT INDEX 706 | PUBLIC PORT 707 | IP PROTOCOL 608 |
|---|---|---|---|---|---|---|---|

FIG. 7

ART
800

| ART INDEX 601 | MAC ADDR 801 | VIRTUAL LAN ID 802 | INTERFACE MASK 803 |
|---|---|---|---|

| IP DESTINATION ADDR 901 | IP SOURCE ADDR 902 | ART INDEX 601 |
|---|---|---|

FIG. 9A

PACKET PROCESSING WITH RE-INSERTION INTO NETWORK INTERFACE CIRCUITRY

CROSS-REFERENCE TO RELATED APPLICATIONS

This patent application is related to co-pending U.S. patent application entitled "METHOD AND APPARATUS FOR DEFLECTING FLOODING ATTACKS" by Thomas A. Maufer and Sameer Nanda, filed Dec. 31, 2002, application Ser. No. 10/334,656, assigned to the same assignee as this patent application, which is incorporated by reference as though fully set forth herein.

This patent application is related to co-pending patent application entitled "METHOD AND APPARATUS FOR PERFORMING NETWORK PROCESSING FUNCTIONS" by Robert A. Alfieri, Gary D. Hicok, Paul J. Sidenblad, filed Dec. 13, 2002, application Ser. No. 10/319,791, assigned to the same assignee as this patent application, which is incorporated by reference as though fully set forth herein.

This patent application is related to co-pending U.S. patent application entitled "NETWORK LEVEL PROTOCOL NEGOTIATION AND OPERATION" by Robert A. Alfieri, filed Sep. 23, 2002, application Ser. No. 10/253,362, assigned to the same assignee as this patent application, which is incorporated by reference as though fully set forth herein.

This patent application is related to co-pending U.S. patent application entitled "METHOD AND APPARATUS FOR SECURITY PROTOCOL AND ADDRESS TRANSLATION INTEGRATION" by Thomas A. Maufer, Sameer Nanda, and Paul J. Sidenblad, filed Jun. 13, 2002, application Ser. No. 10/172,352, assigned to the same assignee as this patent application, which is incorporated by reference as though fully set forth herein.

FIELD OF THE INVENTION

One or more aspects of the invention generally relate to a packet processing and more particularly, to packet re-insertion into network interface circuitry for packet processing.

BACKGROUND OF THE INVENTION

The Internet remains a growing public network. Many companies rely on communication over the Internet using Internet Protocol ("IP") to facilitate their business endeavors. For security in communication over the Internet, a computer may be configured to track and screen communications. This configuration is known as a "firewall," and one or more of the actions of which may be referred to as "firewalling."

In a "stateful firewall," a set of values uniquely identifying each existing connection ("state of each active connection") is maintained, subject to deactivation or disconnection. Conventionally, five values are used to form such a set. These five values are sometimes collectively referred to as a "five-tuple" entry. A five-tuple entry includes respective values for IP Source Address, IP Destination Address, IP Protocol, Transport Layer Source Port ("Source Port"), and Transport Layer Destination Port ("Destination Port"). Examples of IP Protocols include User Datagram Protocol ("UDP") and Transmission Control Protocol ("TCP"). In a UDP or TCP packet, there are IP Source and Destination Addresses in the IP packet header. In a UDP or TCP packet, Source and Destination Ports are in the UDP or TCP header, respectively, as well as an IP Protocol value indicating whether the packet is a UDP or TCP packet. For clarity, a TCP packet is described below, though it will be apparent that a UDP packet may be used.

In a connection using TCP ("a TCP connection"), namely, where TCP packets are exchanged, there is a received packet ("an inbound packet") and a sent packet ("an outbound packet"). Notably, five-tuple entries for inbound and outbound packets are the same except that Source and Destination Addresses are reversed, and Source and Destination Ports are reversed. Of course, in each of these two related five-tuple entries, IP Protocol is the same in both inbound and outbound packets.

In a stateful firewall, a data structure, such as an array, may have respective columns indexed to five-tuple categories of information where each row represents an active connection. Additional columns may be used depending on the level of detail used to evaluate each connection. Such a data structure may be referred to as a "table," indicating a tabularized form of information whether or not headings are used. Five-tuple entries for inbound and outbound packets are stored in a connection table. Connection table stored five-tuple entries are used to compare against five-tuples of inbound and outbound packets to determine whether or not the packets are for use with an existing connection.

When Network Address Translation ("NAT") is employed, five-tuple information is stored to indicate Public IP Address and Public Transport Layer Port ("Public Port") of a NAT configured device ("gateway"). The term "Public" is used to indicate that the address and port of the gateway are accessible from outside a local network associated with the gateway. The term "Remote" is used to indicate a device outside of a local network of the gateway. Notably, the gateway device may be a separate computer or installed in a "Local" computer. The term "Local" refers to a device on a local network of the gateway. For NAT, instances of inbound packets to a NAT gateway, a five-tuple entry includes: an IP Source Address ("Remote IP Address"); an IP Destination Address ("Public IP Address"); a Source Port ("Remote Source Port"); and a Destination Port ("Public Destination Port"). For NAT, instances of outbound packets to a NAT gateway, a five-tuple entry includes: an IP Source Address ("Local IP Address"); an IP Destination Address ("Remote IP Address"); Source Port ("Local Source Port"); Destination Port ("Remote Destination Port"); and IP Protocol.

When an inbound packet having a five-tuple from a Remote device is received by a gateway where the five-tuple matches one stored in a NAT table, the gateway translates such an inbound packet for routing. Using the above describe convention, the five-tuple includes: IP Source Address ("Remote IP Address"); IP Destination Address ("Local IP Address"); Source Port ("Remote Source Port"); Destination Port ("Local Destination Port"); and IP Protocol. This is because a packet from a Remote device is sent to a gateway using Public information, which after found to be part of an active connection is used for address translation for routing to a Local device.

When an outbound packet having a five-tuple from a local device is received by a gateway where the five-tuple matches one stored in a NAT table, the gateway translates such an outbound packet for routing. Using the above described convention, the five-tuple includes: IP Source Address ("Public IP Address"); IP Destination Address ("Remote IP Address"); Source Port ("Public Source Port"); Destination Port ("Remote Destination Port"); and IP Protocol. For clarity, the terms Remote, Local and Public are used below whether or not NAT is being used.

Furthermore, to enhance firewalling security, encrypted information may be established for a connection. Examples of protocols for enhanced security on the Internet include Point-to-Point Tunneling Protocol ("PPTP") and a set of protocols known collectively as Internet Protocol Security ("IPSec"). However, fragmentation of IP packets has been used to defeat firewalls, such as the so-called "ping-of-death," "wedge" and "tiny fragment" attacks. IP version 4 ("IPv4") supports header structures allowing fragmentation of IP packets. Notably, a fragmented packet ("fragment") may be fragmented further, and there is no requirement that fragments arrive in order, or even that they arrive at all. In many stateless firewalls, fragments are summarily process by dropping them. However, fragments are useful when an intermediate router has to forward a packet that is larger than the maximum transmission unit ("MTU") of an outgoing interface ("OIF"). Thus, by dropping fragments, information may be lost. Examples of stateless firewalls may be found integrated in low-end home gateway routers. In higher-end standalone or integrated stateful firewalls, more states are added to verify authenticity of a fragment. This approach facilitates use of devices with significant embedded memory limitations, using less memory than a fragment buffering and reassembly approach.

Accordingly, it would be desirable to have a stateful firewall that buffers and reassembles fragments.

It should be appreciated that whether or not NAT is used a table lookup is done for each packet. Thus, computational cycles are spent for each lookup and comparison of each five-tuple entry. Accordingly, a reduction in computational cycles for packet processing would be useful and desirable.

SUMMARY OF THE INVENTION

An aspect of the invention is a method for re-inserting a packet for network protocol processing, comprising: determining if an audit mode is active; responsive to the audit mode being active, determining if a packet has previously been partially processed by network interface circuitry disposed in a host computer system; if the packet has previously been partially processed by the network interface circuitry, allowing the packet to be processed by the network interface circuitry; and if the packet has not previously been partially processed by the network interface circuitry, testing the packet for network interface compatibility with the host computer system.

An aspect of the invention is a method for handling a burst of packets sent to network interface circuitry, comprising: buffering the packets in memory accessible by the network interface circuitry; incrementing a counter of the network interface circuitry for each of the packets buffered; checking for a connection table entry for the packets buffered; responsive to non-existence of the connection table entry, sending the packets to network interface software for preparing the packets for the network interface circuitry, the network interface software for: building the connection table entry, processing the packets, and sending the packets as processed to the network interface circuitry; forwarding the packets from the network interface circuitry; correspondingly clearing the buffer of the packets responsive to the packets forwarded; and correspondingly decrementing the counter for each of the packets cleared from the buffer.

An aspect of the invention is an apparatus for handling a burst of packets sent to network interface circuitry, comprising: means for buffering the packets in memory accessible by the network interface circuitry; means for incrementing a counter of the network interface circuitry for each of the packets buffered; means for checking for a connection table entry for the packets buffered; means for sending the packets to network interface software for preparing the packets for the network interface circuitry responsive to non-existence of the connection table entry; means for forwarding the packets from the network interface circuitry; means for clearing the buffer of the packets respectively responsive to the packets forwarded; and means for decrementing the counter respectively for each of the packets cleared from the buffer. The network interface software includes: means for building the connection table entry; means for processing the packets; means for sending the packets as processed to the network interface circuitry.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 2A-1, 2A-2, 2B-1, 2B-2, 2C, 2D-1 and 2D-2 are respective flow diagrams of respective exemplary embodiments of portions of the address translation flow of FIG. 1.

FIGS. 6, 7, 8 and 9A are table entry diagrams for respective exemplary embodiments of tables for which information may be stored.

DETAILED DESCRIPTION OF THE DRAWINGS

In the following description, numerous specific details are set forth to provide a more thorough understanding of aspects of the invention as described with respect to exemplary embodiments herein. However, it will be apparent to one of skill in the art that one or more aspects of the invention may be practiced without one or more of these specific details. In other instances, well-known features have not been described for purposes of clarity.

Figure 1:
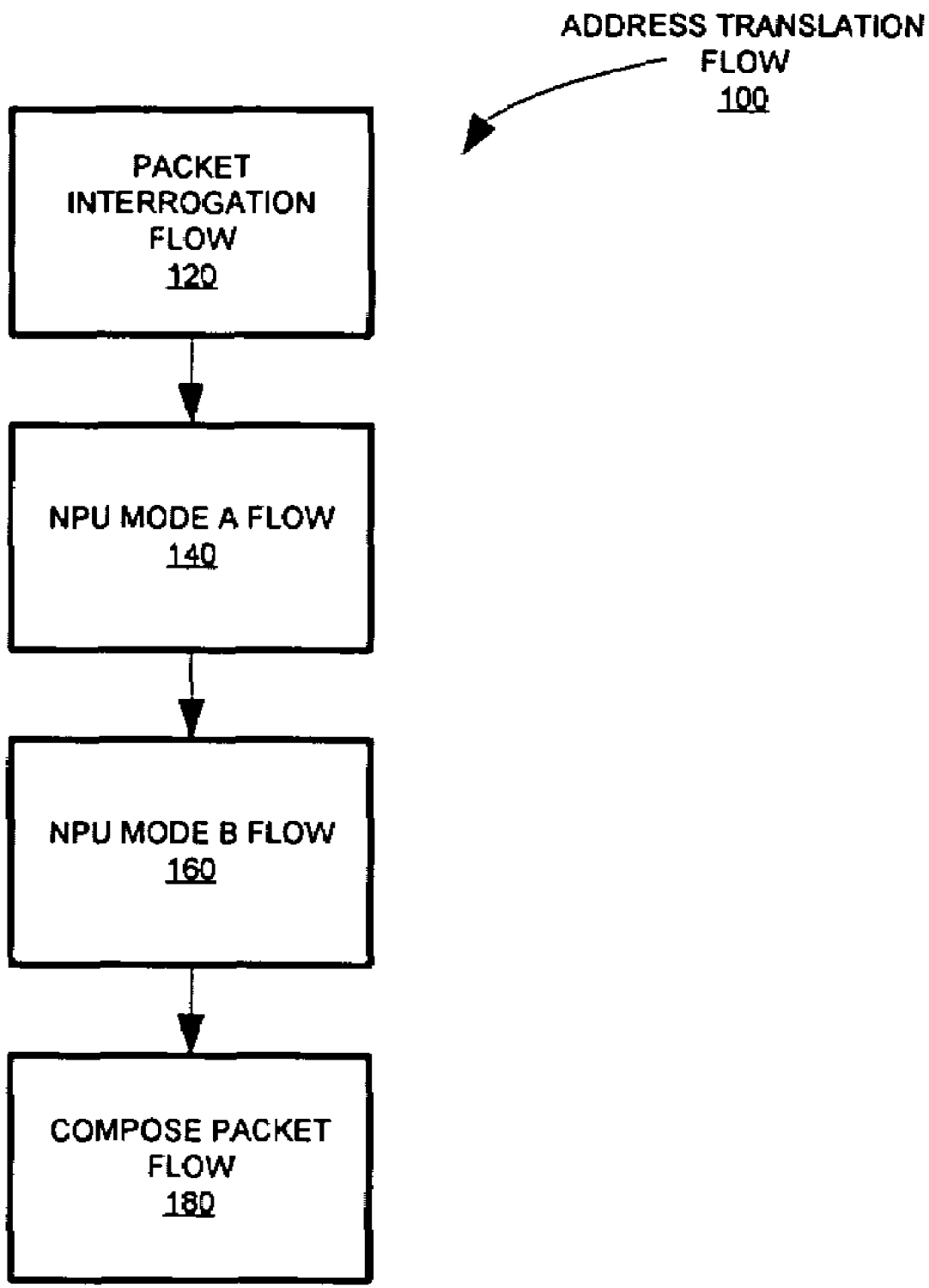
FIG. 1 is a block diagram of an exemplary embodiment of an address translation flow.

FIG. 1 is a block diagram of an exemplary embodiment of an address translation flow 100. Address translation flow 100 includes respective flows or subroutines. A packet is interrogated with packet interrogation flow 120. Output from packet interrogation flow 120 is sent to Network Processor Unit ("NPU") Mode A flow 140. Output from NPU Mode A flow is sent to NPU Mode B flow 160. Output from NPU Mode B flow 160 is sent to compose packet flow 180. Let it be understood that address translation flow 100 may be instantiated in hardware, software or a combination of hardware and software. For clarity, address translation flow 100 is described as an implementation of a combination of hardware and software.

FIGS. 2A-1, 2A-2, 2B-1, 2B-2, 2C and 2D-1 (singly and collectively "FIG. 2") are respective flow diagrams of respective exemplary embodiments of portions of address translation flow 100 of FIG. 1. A packet 101 of a transmission is received. Multiple packets corresponding to multiple connections may be processed at a time for address translation flow 100 of FIG. 1, though for purposes of clarity processing of a single packet is described. This is consistent with how packets are received for a connection, namely, one packet at a time. Notably, if a plurality of packets is received in a short span of time, such packets may be buffered as described below with respect to an NPU. Furthermore, FIG. 2 for the most part is described with respect to an address translator portion of an NPU, and accordingly receiving and transmitting is often done with reference to information going to and from, respectively, the address translator portion.

At 102 a determination as to whether address translation is supported in hardware, such as with an address translator in an NPU. If hardware does not support address translation, a received packet is sent to software providing at least a portion of NPU functionality ("NPUsoft") with error condition ("E") 103. NPUsoft represents handling of a packet as embodied in software. For clarity, NPUsoft activity in instances is not described in any detail because either such processing follows from description of the hardware implementation or such processing is conventional. If, however, hardware does support address translation, then at 104 optionally a determination as to whether an audit mode is in an active state. Notably, an audit mode is generally for testing, and thus need not be employed in a tested product. If an audit mode is in an active state, then a determination is made at 105 as to whether packet 105 is a "re-inserted" packet. By "re-inserted" packet, it is meant a packet moved out of address translation flow 100 with respect to hardware processing for processing by software, NPUsoft, prior to being re-inserted back into address translation flow 100.

If at 105, packet 101 is not a re-inserted packet, namely, this is the first time packet 101 has been partially processed by address translation flow 100, then packet 101 is sent to NPUsoft with error condition 106. This allows packet 101 to be tested, such as by a host computer system programmed with NPUsoft, prior to further processing in hardware for compatibility with such hardware. If, however, packet 101 has previously been partially processed with address translation flow 100 or an audit mode is not active, then at 107 a determination is made as to whether information may be obtained from packet 101. If information may be readily obtained from packet 101, then such information is processed at 107. At 107, a packet is broken out into a data structure for parsing information into distinct fields, such as for a table. This alternate representation of a packet may be done in software for purposes of building tables of information. Tables that may used for FIG. 2 are described in additional detail with reference to FIGS. 6, 7, 8 and 9A.

Figures 1, 2A:
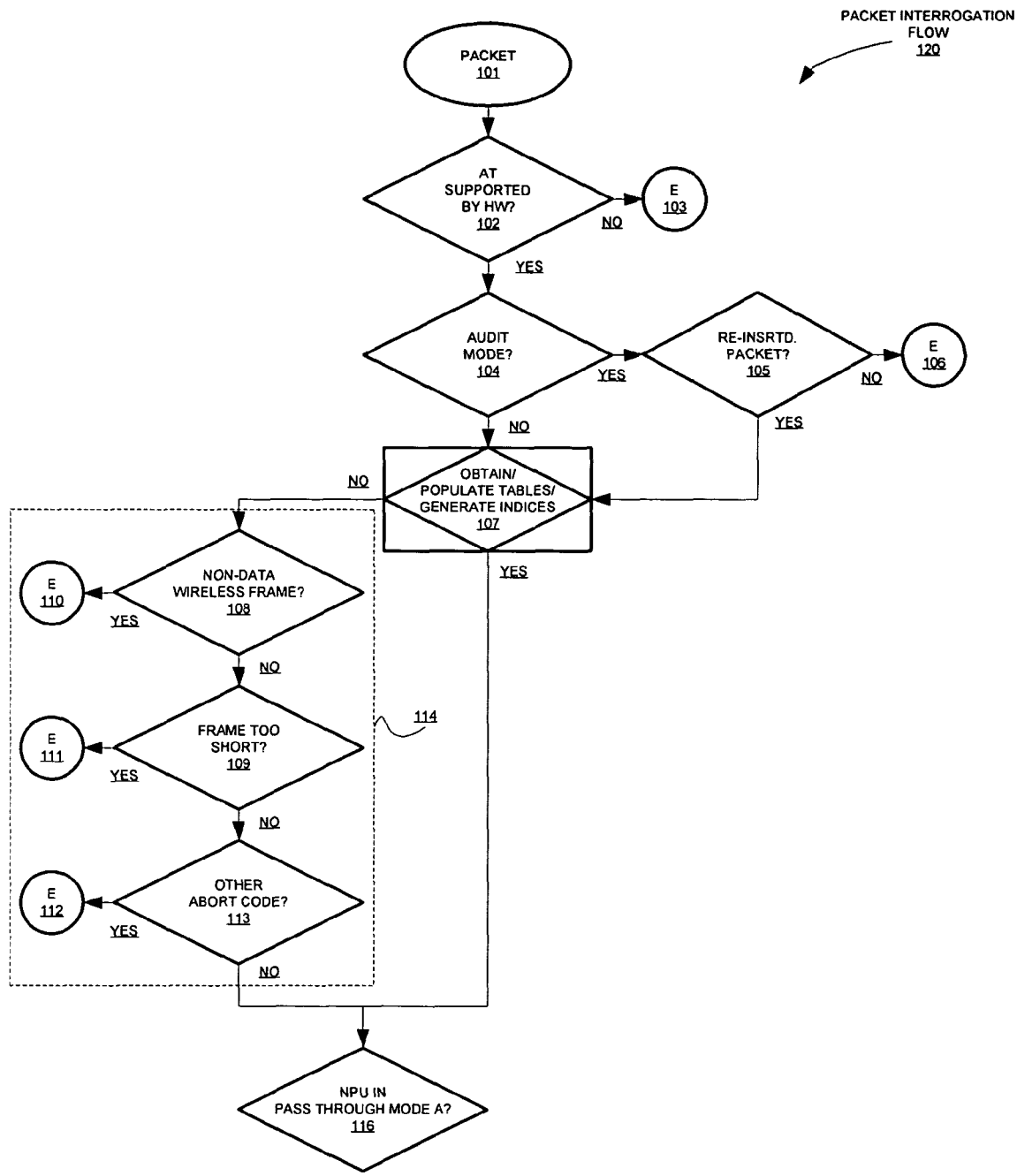
Figures 2, 2A:
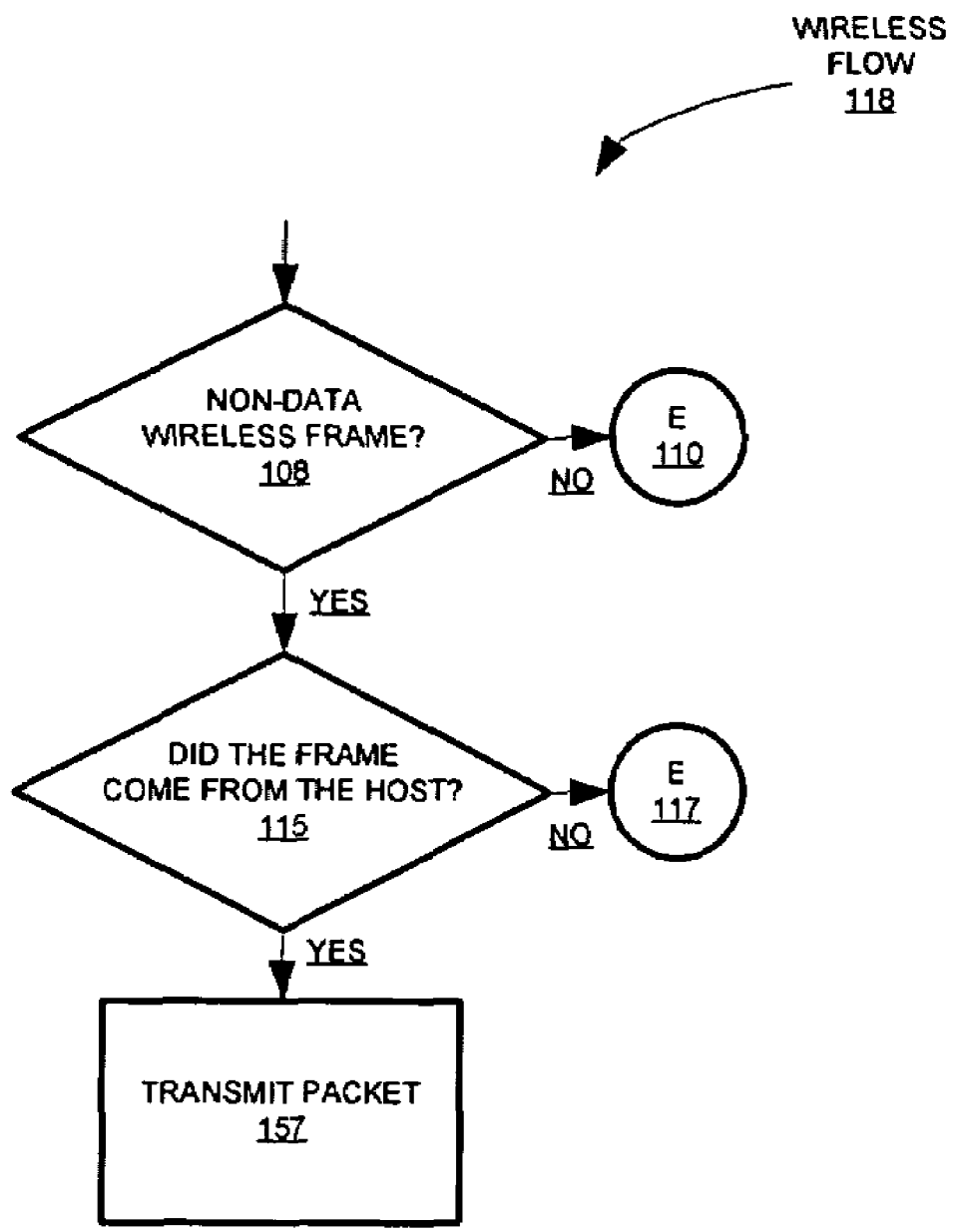
Figure 11:
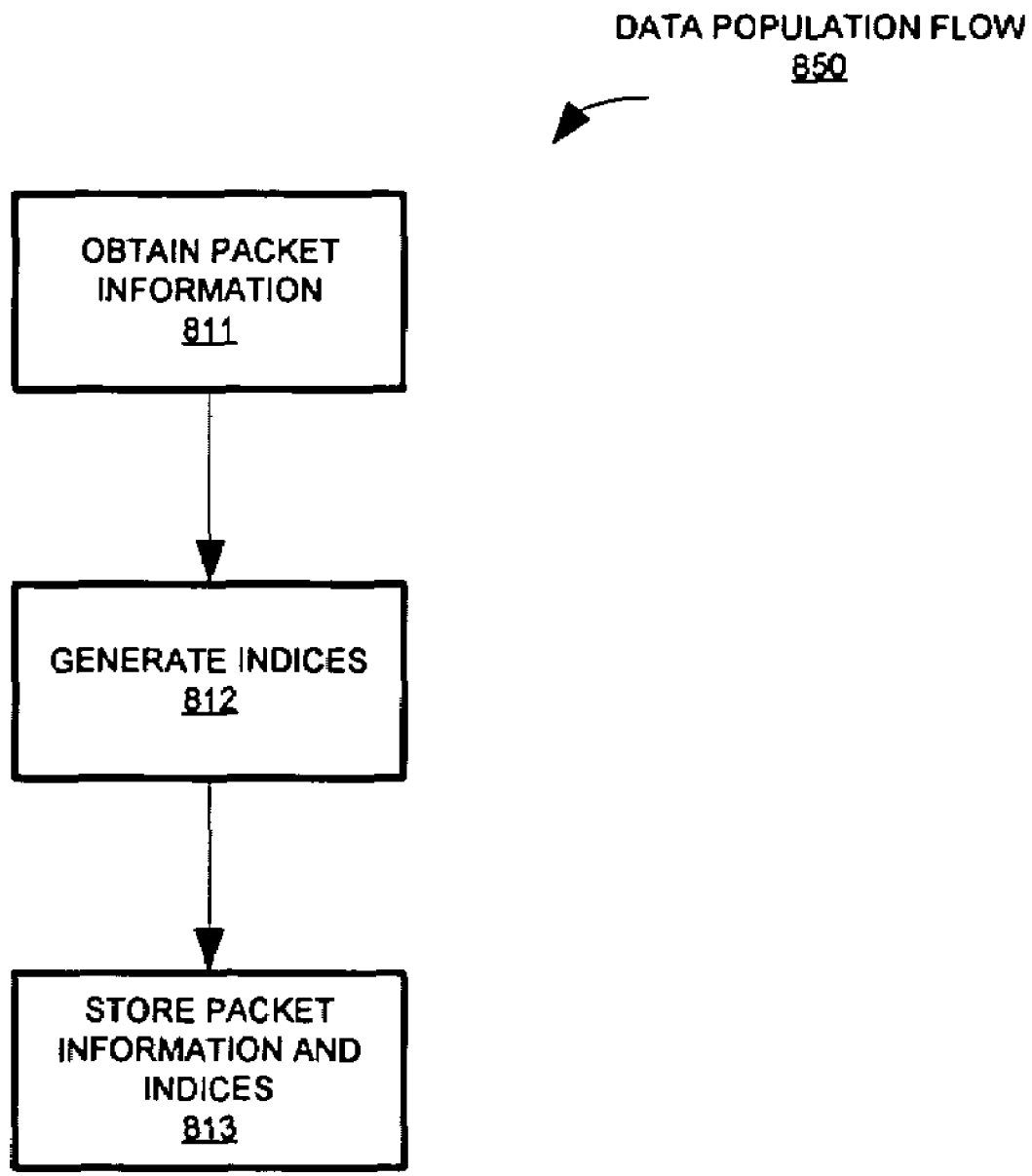
FIG. 11 is a flow diagram of an exemplary embodiment of portion of a data structure population flow.

FIGS. 6, 7, 8 and 9A are table entry diagrams for respective exemplary embodiments of tables for which information, such as from a packet 101 of FIG. 2, may be stored. FIG. 11 is a high-level flow diagram of an exemplary embodiment for a data structure population flow 850. Data structure population flow 850 is described with simultaneous reference to FIGS. 2, 6, 7, 8 and 9A.

If packet 101 is an inbound or outbound packet from which information may be obtained, then at 811 packet information, such as five-tuple, is obtained. Additionally, interface information relative to packet 101, such as Media Access Control ("MAC") information, may be obtained at 811.

At 812, respective indices are generated using packet information obtained at 811. At 813, packet information, interface information and indices are stored in data structures. Examples of data structures are Connection Table ("CT") 600, or if NAT is being used, NAT Table ("NT") 700. Interface information is stored in Address Resolution Table ("ART") 800. For example, an index generated from five-tuple information is stored in either CT 600 or NT 700 for cross-linking such tables, as described below in additional detail. For example, an index generated from an entry in ART 800, for example by hashing all or a portion of an entry of interface information, is stored in CT 600, or in NT 700 if NAT is being used, for cross-linking with ART 800, as described below in additional detail. Additionally, such an ART index may be stored in ART 800 to avoid recalculation of such an index, for example when updating an auxiliary Canonical Frame Header ("xCFH") of packet 101 for broadcasting, as described below in additional detail. A CFH is a data structure, separate from packet 101, that travels with packet 101, where data for a CFH is derived from packet 101, as described below in additional detail. Moreover, an ART index from such interface information is stored in Routing Table ("RT") 900 for cross-linking with ART 800, as described below in additional detail.

It should be noted that CT 600, NT 700 and RT 900 are linked to ART 800 via ART index 601. Thus, CT 600, NT 700 and RT 900 are somewhat dependent on ART 800. For example, there may be one or more than one CT entry linked to the same ART entry. It should be further noted that CT 600 is linked to NT 700 via NT index 606, and it should further be noted that NT 700 is linked to CT 600 via CT index 706. Thus, CT 600 and NT 700 are cross-linked.

Figure 9B:
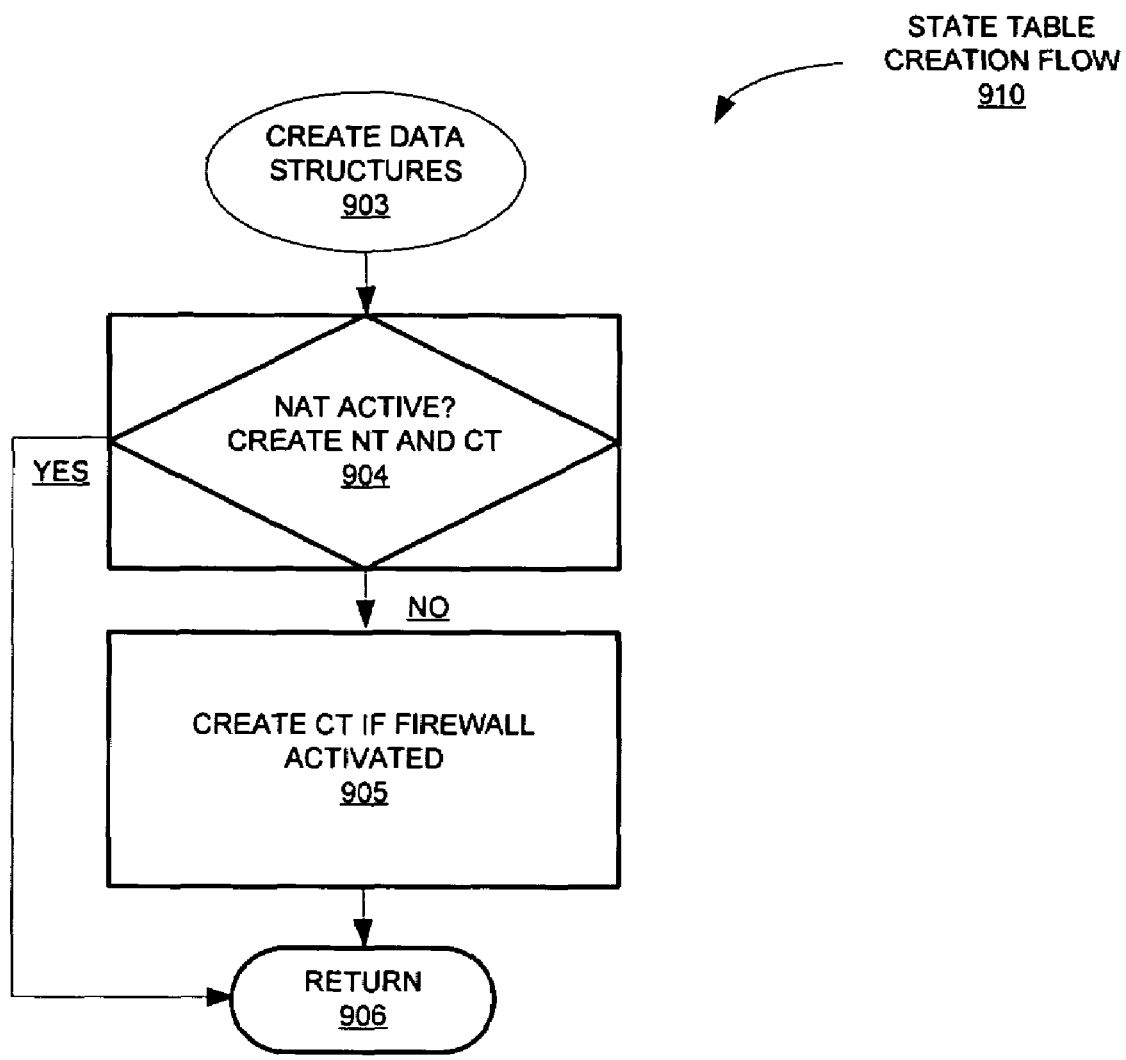
FIG. 9B is a flow diagram depicting an exemplary embodiment of a state table creation flow.

Rather than having one large state table or other data structure for CT 600 and NT 700 information, two linked state tables are used to conserve memory. For example, if NAT is not being used, whether supported or not, many entries in a single state table may be left blank. Accordingly, by populating a smaller table with higher usage efficiency, memory usage is reduced over use of a larger table with lower usage efficiency. However, it should be understood that one or more of state tables 600, 700, 800, and 900 may be combined. However, for purposes of clarity, separate state tables 600, 700, 800, and 900 are described. Notably, CT 600 and NT 700 may be created according to whether firewalling or NAT is active. Referring to FIG. 9B, there is shown a flow diagram depicting an exemplary embodiment of a state table creation flow 910. State table creation flow 910 may, for example, be instantiated in software for creation of state tables 600, 700, 800, and 900. A command, such as create data structures 903, may be initiated as part of a startup mode. At 904, it is determined whether NAT is active. If NAT is active, CT 600 and NT 700 are created to allow for NAT, and CT 600 is used for tracking TCP state. Notably, TCP state is tracked whether or not firewalling is active. After which, state table creation flow 910 returns at 906. If NAT is not active, then at 905 CT 600 is created if firewalling is active for tracking TCP state information. If the firewall is not active, CT 600 is not created. At 906, state table creation flow 910 returns.

It should be understood that for NAT to take place, a packet needs to be in compliance with a NAT protocol. Accordingly, if a packet were not in compliance, such a communication would fail. Thus, to reduce or avoid firewall processing of invalid packets, FIG. 2 is described as being done in front of a firewall. Thus, firewall policies may be instantiated in an address translator portion of an NPU, as described below in additional detail, and pointing from a NT 700 to a firewall data structure may be postponed until confirmation that such a packet is in compliance for NAT. This is more evident with respect to the description of output filtering below.

For a non-NAT connection, information stored in CT 600 generally includes an IP Protocol 607, a Remote IP Address 602, a Remote Port 605, a Local IP Address 604 and a Local Port 607. For a NAT connection, information stored in NT 700 typically includes an IP Protocol 607, a Remote IP Address 602, a Remote Port 605, a Public IP Address 704 and a Public Port 707. Notably, an inbound or outbound packet is either a remote or local packet, and thus entries for such packets may be "remote five-tuple" and "local five-tuple" entries for inbound or outbound packets. Thus, it should be appreciated that for inbound packets: Remote IP Address 602 are IP source addresses; Public IP Addresses 704 and Local IP Addresses 604 are IP destination addresses; Remote Ports 605 are source ports; and Public Ports 707 and Local Ports 607 are destination ports. Furthermore, it should be appreciated that for outbound packets: Local IP Addresses 604 and Public IP Addresses 704 are IP source addresses; Remote IP Addresses 602 are IP destination addresses; Local Ports 607 and Public Ports 707 are source ports; and Remote Ports 605 are destination ports. There are some exceptions to this for handling security protocol packets.

Additionally, for a stateful firewall, at least a TCP state 609 for each connection may be stored in CT 600. Other known attributes, such as sequence numbers, acknowledgment numbers, and window size, among other known state variables, may be stored in CT 600. These other attributes may be associated with a five-tuple entry. For example, additionally a Sequence Number 610 for each inbound and outbound packet may be stored in CT 600. Notably, TCP State in addition with other state attributes may be stored only in CT 600 even though NAT is being used. Recall from above, that two smaller tables are used rather than a single large table. Accordingly, attributes for stateful firewalling may be stored in one location, namely, CT 600.

If a secure connection has been established, such as with IPSec or PPTP, then a portion of an inbound five-tuple, whether non-NAT or NAT, may be encoded. Accordingly, either a Security Parameters Index ("SPI") or Generic Routing Encapsulation ("GRE") Call Identification ("GRE Call ID") 603 run over an IPSec or PPTP, may be stored in CT 600, or NT 700 if NAT is being used. However, encryption, decryption, compression or decompression may be done in a sequence processor portion of an NPU, and thus packet 101 is presumed to be in a non-encrypted and non-compressed state for FIG. 2, to the extent a security protocol allows. Because some information of a security protocol is encrypted, other information is used instead. For example, in CT 600 or NT 700, SPI/GRE Call ID 603 is a flag used to indicate that no security protocol is being used or that either an SPI or GRE Call ID is being used, where the index or call identification is actually broken out into two portions, one portion of which is stored in a remote port data space and another portion of which is store in a public port data space. An example of use of IPSec and NAT is describe in co-pending U.S. patent application entitled "METHOD AND APPARATUS FOR SECURITY PROTOCOL AND ADDRESS TRANSLATION INTEGRATION" by Thomas A. Maufer, Sameer Nanda, and Paul J. Sidenblad, filed Jun. 13, 2002, application Ser. No. 10/172,352, which is incorporated by reference as though fully set forth herein, NAT may be used with a security protocol.

Indices are computed for each CT 600 entry, each NT 700 entry and each ART 800 entry. A CT Index 706 and an ART Index 601 are stored in NT 700. An NT Index 606 and an ART Index 601 are stored in CT 600. An ART Index 601 is stored in RT 900. Indices are computed by hashing values for an entry, for example for a five-tuple entry in CT 600 or NT 700. A hash of an entry or portion thereof represents an index to that entry in that table. For example, a hash of a five-tuple forming a portion of an entry may be used as an index to the entry. Indices are stored in tables in association with a corresponding entry. Accordingly, tables are cross-linked through such indices, except for ART 800 which does not need to be cross-linked.

Computational cycles are expended for an initial table lookup. However, by creating and storing table entry indices, entries are cross-linked. For example, each NT entry is cross-linked with a corresponding CT entry, and each CT entry is cross-linked with a corresponding NT entry. Following a link to a corresponding entry in another table is less computationally intensive than looking up an entry by checking for matches of a plurality of values, such as a five-tuple, each time a table is accessed. Additionally, by storing a hash of an entry, re-computation of such a hash is avoided thereby reducing use of computational resources.

CT 600 and NT 700 each store links to ART 800 via ART index 601. ART index 601 is a hash of an entry in ART 800. In this manner, CT 600 and NT 700 are respectively cross-linked with ART 800. ART 800 stores information associated with delivery of packet 101, namely, a MAC address and other MAC-layer attributes. For example, a MAC Address 801, a Virtual Local Area Network (LAN) Identification (ID) 802 and an Interface Mask 803 may be stored in ART 800. MAC Address 801 is a next destination address for packet 101, which may be a next hop final destination or a next hop toward the final destination address.

It is less computationally intensive to follow a link corresponding to an ART entry than hashing a packet's destination address, such as an IP Destination Address 901. By storing an ART index 601 for each ART 800 entry in RT 900 along with an IP Destination Address 901, a MAC Address 801, as well as other MAC-layer attributes, from ART 800 is linked to such IP Destination Address 901. Thus, it should be appreciated that once a match to an index is found in CT 600 or NT 700, an ART index may be obtained leading to a next hop IP Destination Address 901 or MAC Address 801. Thus, once entries for packet and interface information are instantiated for a first packet of a connection, all subsequent packets may be processed by hashing information for matching an index. Hashes for indices 601, 606 and 706, may be done responsive to initialization of an associated state table entry for a first packet sent with respect to a connection. By saving computed indices for a connection, with a single hash for each subsequent packet for such connection, translation or forwarding data for each subsequent packet may be found by linking to an appropriate table entry, using subsequent packet hashing. Notably, RT 900 may be used when a routing only condition exists. Thus, if one or both of firewalling and network address translating ("NAT'ing") is done, then RT 900 may be bypassed as CT 600 and NT 700 are linked with ART 800 via ART Index 601.

Accordingly, performance in packet processing is enhanced, and thus throughput is increased. Furthermore, as described with respect to use of a parallel data structure, namely, an xCFH data structure that travels with packet 101, indices are embedded to further enhance packet forwarding, namely, routing or bridging.

It is possible that a same hash results from two or more respective entries. Accordingly, as a failsafe measure, after an entry has been accessed by finding a match of a hash of a received packet as an index in a state table, a comparison of such currently received packet's information to packet information for a previously received packet for a connection stored in such state table may be made. For example, a comparison of five-tuples may be done responsive to a match of such a hash of a received packet to a stored index. Though this adds additional overhead, it is still less computationally intensive for example than comparing what potentially may be an entire table of five-tuples to a five-tuple of a currently received packet. Moreover, by having separate tables, fewer entries within a table need to be checked for matches. Furthermore, hash function output values, as described below, may be employed as table indices.

With the above-described context, the remainder of address translation flow 100 with respect to FIG. 2 is described.

Returning to FIG. 2, if, at 107, information cannot readily be obtained from packet 101, then at 114 a determination is made as to whether such a packet 101 may continue to be processed with packet interrogation flow 120. For example, at 108 a check may be made as to whether packet 101 is part of a non-data over-the-air ("wireless") frame. Notably, the packet interrogator is described in terms of a parser of wireless data frames and not as being configured to parse non-data wireless frames, as described below in additional detail. If packet 101 is part of a non-data wireless frame, then packet 101 is sent to NPUsoft with error condition 110. If packet 101 is not part of a non-data wireless frame, then at 109 a check may be made to determine if a frame used for sending packet 101 was insufficient, namely, too short. If such a frame was too short, then packet 101 is sent to NPUsoft with error condition 111. If the frame was not too short, then at 113 a check for another abort code may be made. If another abort code is found for packet 101, then packet 101 is sent to NPUsoft with an error condition for such other abort code, for example error condition 112. Notably, error conditions 111 and 112 may lead to dropping packet 101 if too incomplete to process. Recall, packet 101 is now formatted in a data structure that is more readily parsed.

Alternatively, a packet interrogation flow alternative is shown in FIGS. 2A-2, where wireless flow 118 includes checking for a non-data wireless frame 108. However, if it is not a non-data wireless frame at 108, then packet 101 is sent to NPUsoft with error condition 110. If it is a non-data wireless frame at 108, then at 115 it is determined if the frame came from the host computer or device. If the frame came from the host at 115, then packet 101 is transmitted at 157. Otherwise, if the frame did not come for the host as detected at 115, packet 101 is sent to NPUsoft with error condition 117. In other words, if a non-data wireless frame came from wire, it is not put back on wire. Thus, non-data wireless frames are only transmitted by an address translation ("AT") subunit of an NPU if they came from a host device, where firewalling and NAT are bypassed for such transmission. However, alternatively, the packet interrogator may be configured to parse non-data wireless packets, and state could be tracked for such parsed non-data wireless packets.

With continuing reference to FIG. 2, at 116, a determination is made as to whether an NPU is in a Pass-through Mode A. Pass-through Mode A is a pass-through mode with frame conversion only, which may be determined from a MAC header of packet 101. Thus, if only a frame conversion is needed for bridging, a significant portion of address translation flow 100 may be bypassed. If an NPU is in pass-through Mode A, then at 156 packet 101 is composed, namely, header format is converted, for example from an IP format to an Ethernet format. Such composed packet 158 is transmitted at 156, for example to a firewall module of an address translator or a sequence processor portion of such an NPU.

If Pass-through Mode A is not invoked, then at 121 a determination is made as to whether multicast reception is active on an Incoming Interface ("IIF") for a group of listeners of a multicast. If multicast reception is not active, then packet 101 is sent to NPUsoft with an error condition, for example error condition 122.

At 123, a data link layer ("layer-2") validity check is done. A layer-2 validity check determines whether a MAC source address is a multicast MAC address and whether there is a length error for a frame used for such a MAC address. Additionally, a layer-2 validity check may involve checking whether a report, which may be termed a "cracker report," generated as a result of obtaining information at 107 indicated an error in an xCFH for packet 101. If at 123, packet 101 is found to be invalid as a result of a layer-2 validity check, then packet 101 is sent to NPUsoft with an error condition, for example error condition 124.

A packet 101 determined to be valid at 123 is checked at 125 for packet protocol type and protocol support on the IIF. If IP protocol of packet 101 is not supported by a network processing unit, then packet 101 is sent to NPUsoft with an error condition, for example error condition 126.

Figures 1, 2B:
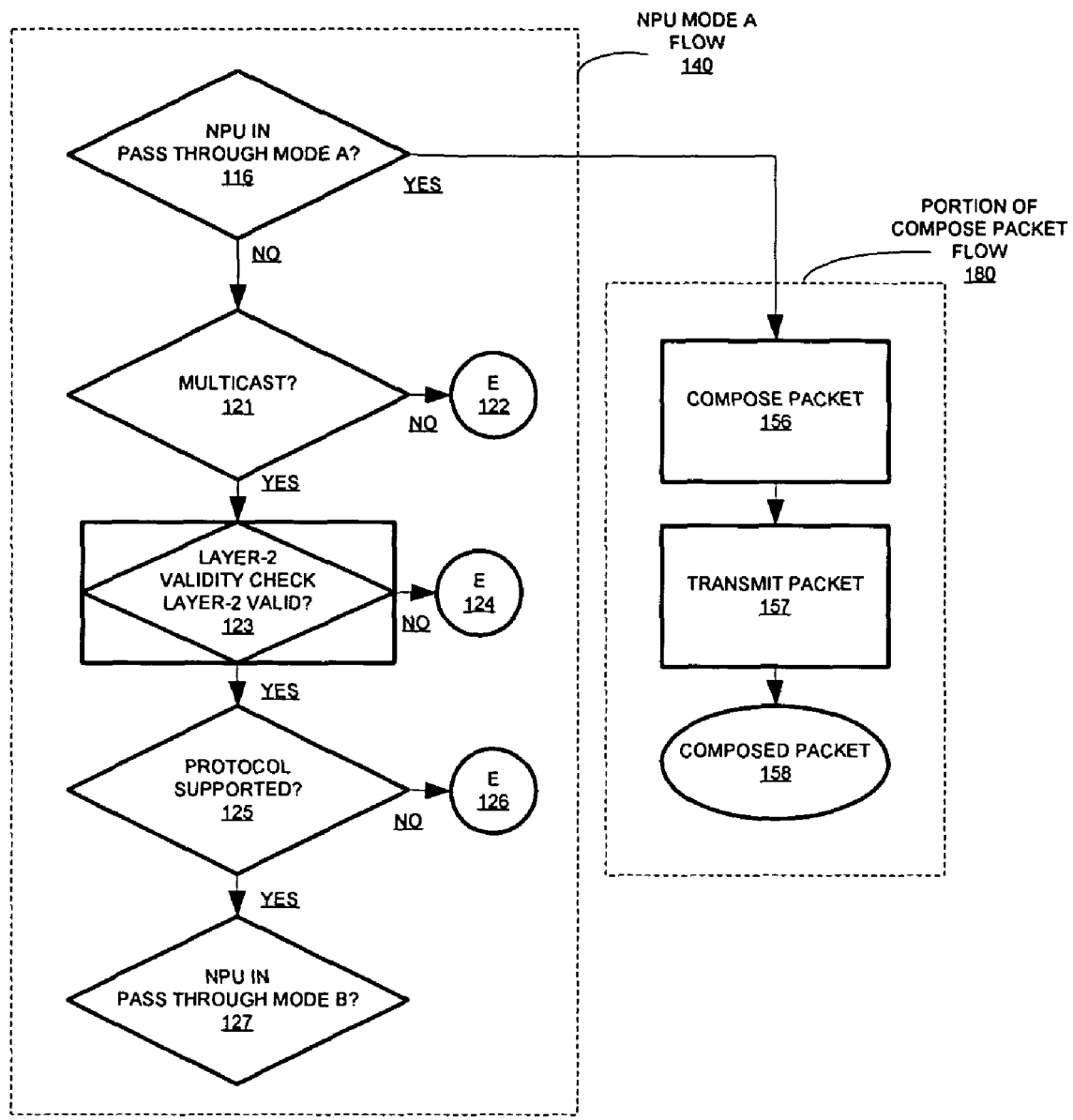
Figures 2, 2B:
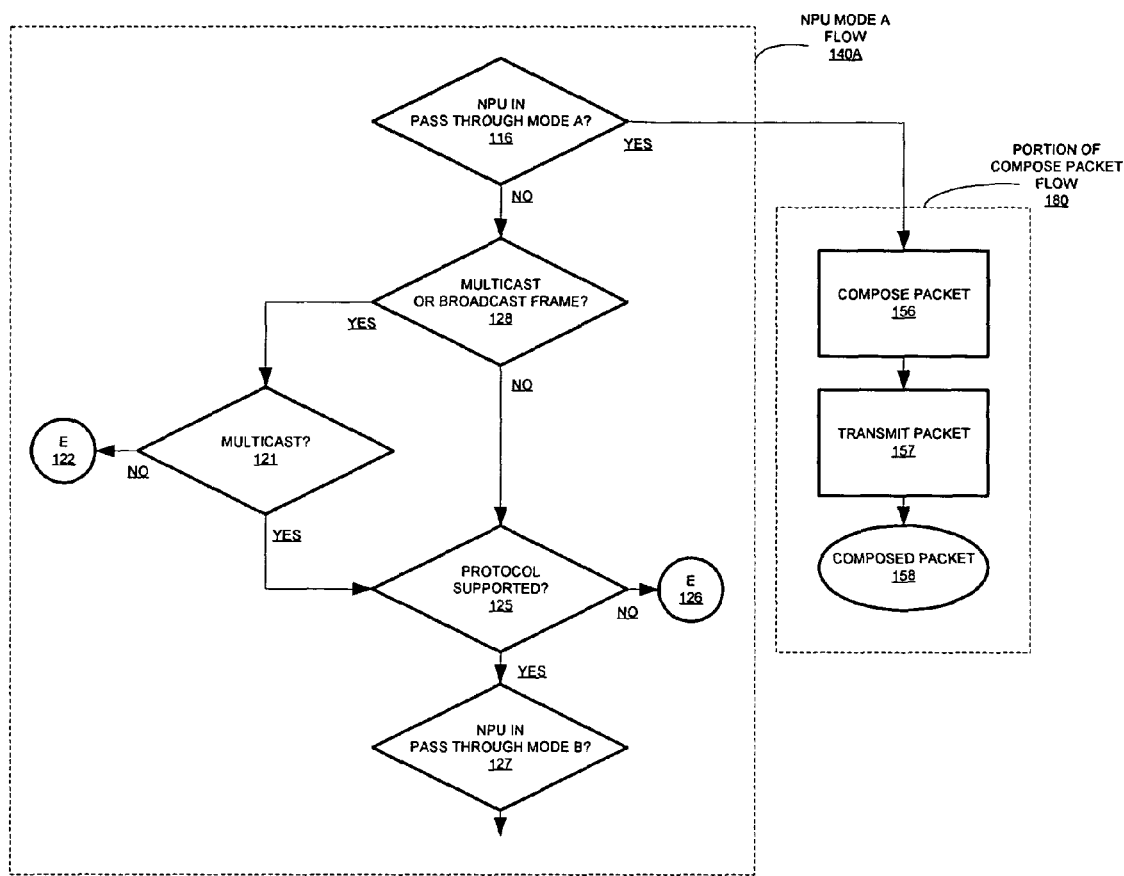

Alternatively, an NPU mode A flow 140A may be used. Referring to FIGS. 2B-2, for an NPU not in pass through mode A, at 128 a determination is made as to whether a frame for packet 101 is a multicast or broadcast frame. If such a frame is a multicast or broadcast frame, then a check for multicast or broadcast active on the IIF is made at 121, as previously described. Otherwise, if such a frame is not a multicast or broadcast frame, then at 125 a check for a supported protocol is made as previously described. Notably, layer-2 validity checking is not done here in this alternative, as layer-2 validity checking may be moved and done with layer-3 validity checking as described below with respect to filtering.

If IP protocol of packet 101 is supported, then at 127 it is determined whether an NPU is in Pass-through Mode B. Pass-through Mode B is a pass-through with firewall-only mode. This may be determined by accessing a data structure, such as a table, indicating whether firewalling-only has been activated for packet 101. If such an NPU is in Pass-through Mode B, a check is made at 153 of FIG. 2C to determine if packet 101 is a non-IP protocol packet. If, however, such an NPU is not in Pass-through Mode B, then other processing occurs prior to checking whether packet 101 is a non-IP protocol packet.

Figure 2C:
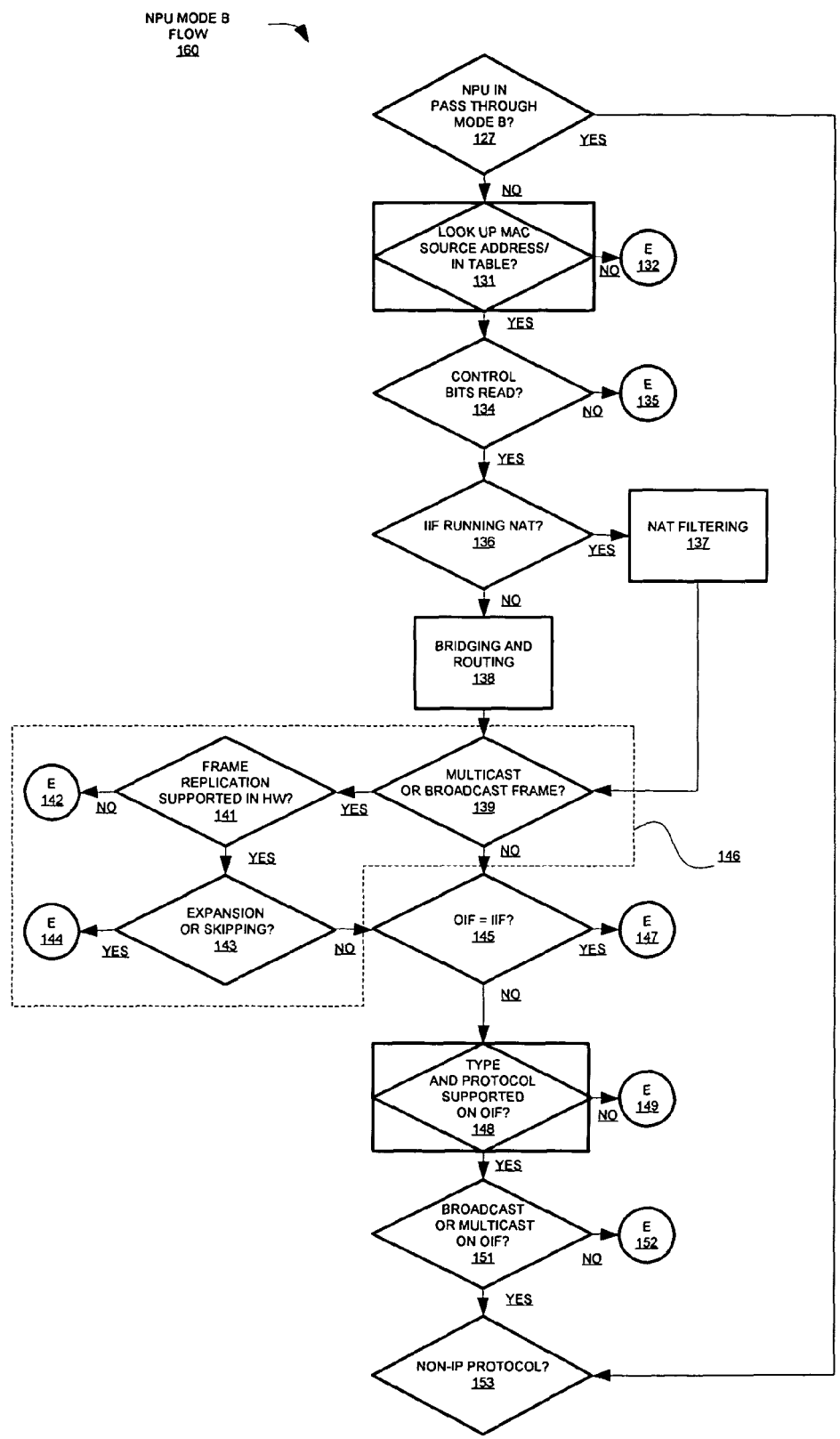

Referring to FIG. 2, and in particular FIG. 2C, at 131, optionally a hash of interface information of packet 101 is done, otherwise a lookup is done by comparing MAC source addresses. If a hash is done, the result may be stored as an ART Index in an xCFH for data path flow with packet 101. Assuming a hash is not done, a check is made to determine if a MAC source address for a frame obtained from packet 101 is in an ART, such as ART 800 of FIG. 8. If a MAC source address for packet 101 is not in ART 800, for example if packet 101 is an initial packet of a connection, then packet 101 is sent to NPUsoft with an error condition, for example error condition 132, meaning that ART entries need to be built for this packet 101. In addition to such an error message, optionally the hash of packet 101, if optionally done, may be sent to NPUsoft. NPUsoft may use packet 101 for bridge learning and optionally for IEEE 802 authorization. However, NPUsoft may determine that packet 101 is to be dropped. If, however, a MAC source address for packet 101 is in ART 800, then at 131 such MAC source address is looked up from ART 800.

At 134, control bits may be read from an ART entry associated with a MAC source address looked up at 131. Control bits provide flags responsive to events, for example as indicated with respect to error conditions for invoking NPUsoft. If control bits cannot be read, then packet 101 is sent to NPUsoft with an error condition, for example error condition 135. If control bits are read at 134, then at 136 a determination is made as to whether the IIF is running NAT. Additionally, at 136, a check may be made to determine if the frame has an IP packet 101. If NAT is running, then at 137 inbound NAT filtering is done, and at 139 a check is made as to whether a frame used for packet 101 is a broadcast or multicast frame. Notably, bridging and routing may be bypassed if NAT is running. This is because an ART Index providing a pointer to table entries is embedded in an xCFH traveling with packet 101. If NAT is not running at 136, then bridging and routing is done at 138A, and at 139 a check is made as to whether a frame used for packet 101 is a broadcast or multicast frame.

If, at 139, either a multicast or broadcast frame is being used, then at 141 a check for hardware support for multicast or broadcast frame replication is made responsive to frame type. If multicast or broadcast support is found to be lacking at 141, then packet 101 is sent to NPUsoft with an error condition, for example error condition 142. If such support in hardware exists, then at 143 a check is made to determine if expansioning or skipping for multicast or broadcast, depending on frame type, includes any disallowed outgoing interface ("OIF") for a group of listeners. If one or more disallowed OIFs are included, then packet 101 is sent to NPUsoft with an error condition, for example error condition 144. Error condition 144 means that multicasting or broadcasting is not supported or that packet 101 is invalid with respect to multi-casting or broadcasting. Accordingly, packet 101 may be dropped. If, however, no disallowed OIF is included as determined at 143, or no multicast nor broadcast frame is used as determined at 139, then at 145 a check is made to determine if the OIF equals the IIF for packet 101. Notably, steps 146 may be moved to a routing and bridging flow, as described below in additional detail. If the IIF and the OIF are equal, then an interface mask, such as interface mask 803 of FIG. 8, is for an IEEE 802.11 interface and then packet 101 is sent to NPUsoft with an error condition, for example error condition 147, for processing by NPUsoft or dropping. If, however, the IIF and the OIF are not equal, then at 148 a check for IP protocol type of the OIF is made. At 148, it is determined whether the IP protocol type is supported on the OIF. If the IP protocol type is not supported on the OIF, then packet 101 is sent to NPUsoft with an error condition, for example error condition 149, for processing by NPUsoft or dropping.

If the IP protocol type is supported on the OIF as determined at 148, then at 151 it is determined whether broadcasting or multicasting is invoked for the OIF. Notably, determining whether broadcasting or multicasting of packets being sent out via the OIF is permitted at 151 is optional here, and may be done in a routing and bridging flow as described below. If broadcasting or multicasting is not invoked for the OIF, then packet 101 is sent to NPUsoft with an error condition, for example error condition 152, for processing by NPUsoft or dropping. If, however, broadcasting or multicasting is invoked for the OIF, responsive to frame type, or if an NPU is in Pass-through Mode B, a check is made at 153 to determine if packet 101 is a non-IP protocol packet.

Figures 1, 2D:
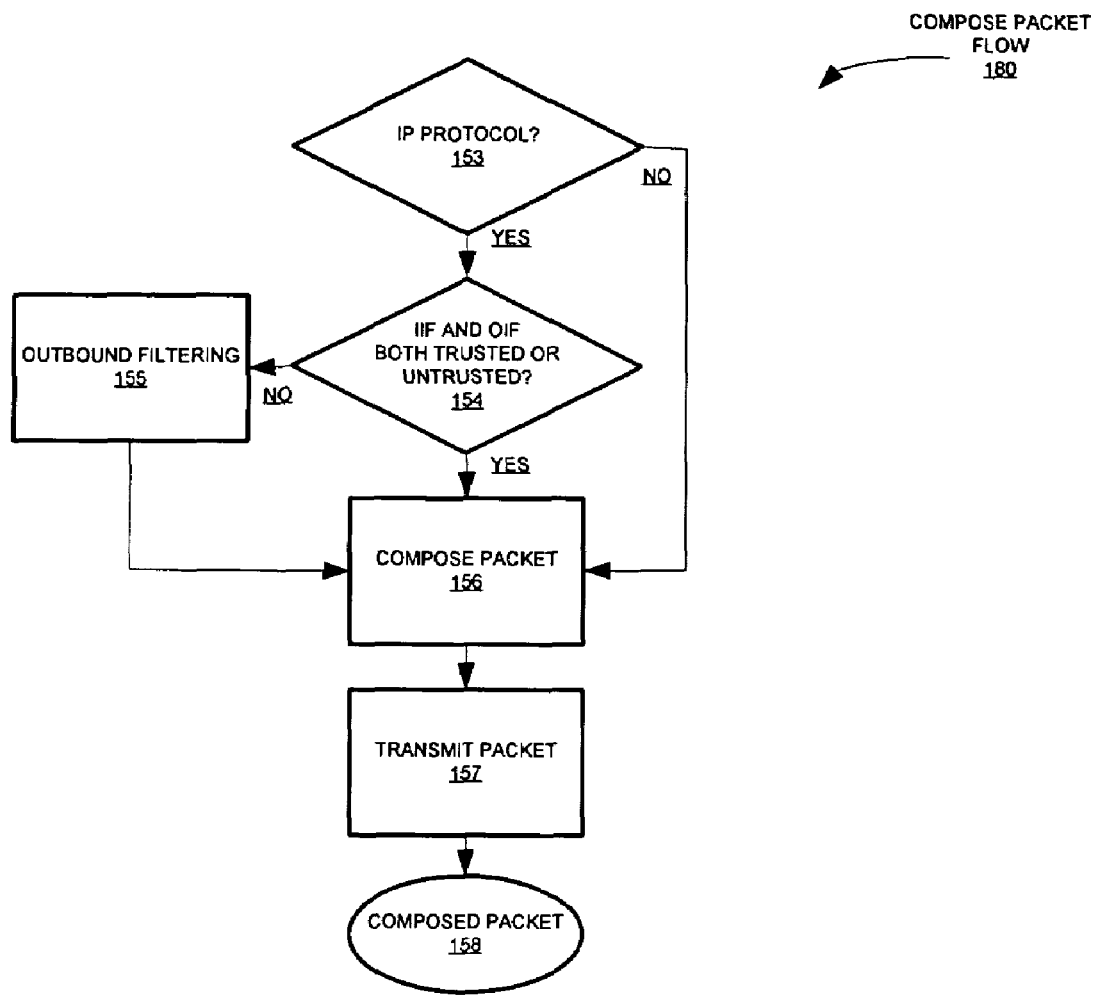
Figures 2, 2D:
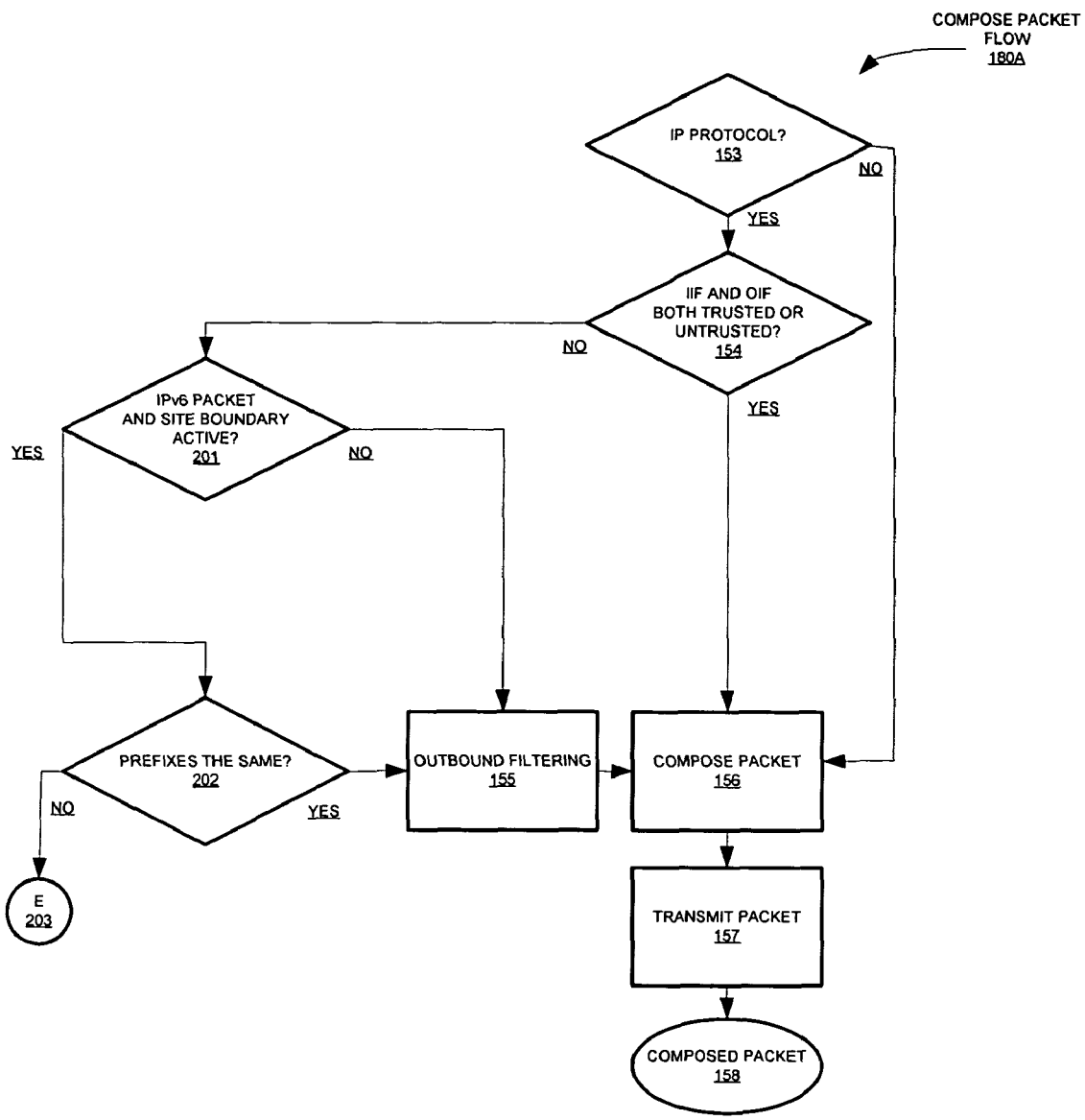

Referring to FIG. 2, and in particular FIGS. 2D-1, If packet 101 is of a non-IP protocol type at 153, then packet 101 sent without outbound filtering, where at 156 packet 101 is composed to produce composed packet 158 and processed further as previously described. If, however, packet 101 is not of a non-IP protocol type, then at 154 it is determined whether the OIF and the IIF are both trusted or both not trusted, for example by processing a trust bit for each through an XOR gate. If both are trusted or both are not trusted, then composition of packet 101 takes place as previously described. If, however, one of the IIF or the OIF is trusted and the other one of the OIF and the IIF is not trusted, then at 155 outbound filtering is done. After outbound filtering, packet 101 is composed at 156 as previously described.

Alternatively, with reference to FIGS. 2D-2, an alternative compose packet flow 180A is shown. As much of compose packet flow 180A is the same as that of compose packet flow 180 of FIGS. 2D-1, it is not repeated. If it is determined at 154 that the OIF and the IIF are not both trusted or untrusted, then at 201 it is determined whether packet 101 is an IP version six ("IPv6") packet or IPv6 site boundary enforcement is active. If packet 101 is not an IPv6 packet or IPv6 site boundary enforcement is not active, then outbound filtering takes place at 155. Otherwise, at 202 a determination is made as to whether a site prefix in a destination address for IPv6 packet 101 is the same as the OIF's site prefix. If the two prefixes are not the same, packet 101 is sent to NPUsoft with an error condition or dropped at 203. Otherwise, packet 202 is sent to 155 for outbound filtering.

Figure 3A:
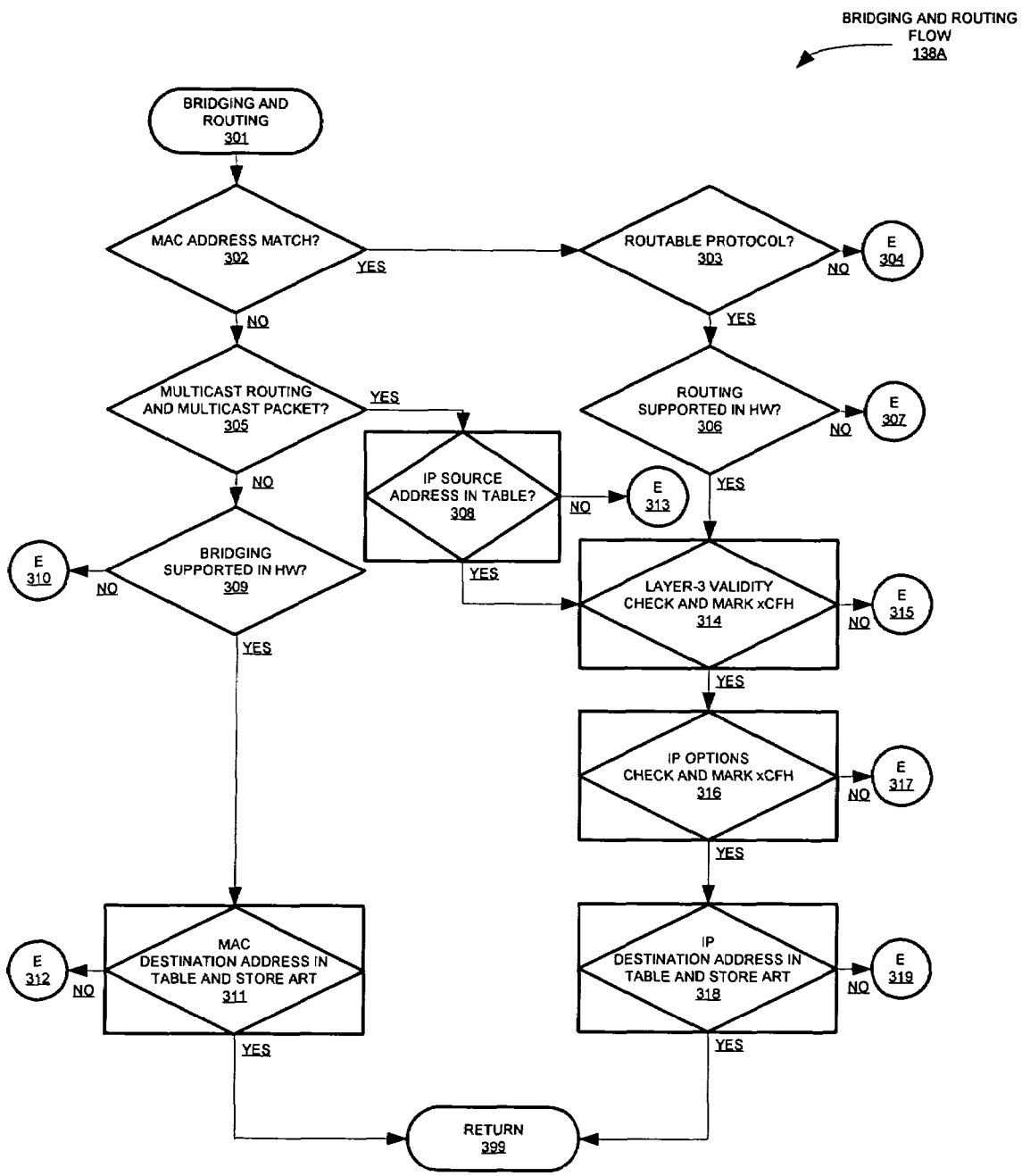
FIGS. 3A, 3B and 3C are flow diagrams of respective exemplary embodiments of bridging and routing flows.

FIG. 3A is a flow diagram of an exemplary embodiment of a bridging and routing flow 138A. Recall from above, an ART entry hash optionally may have been done for packet 101 and such an ART index may be traveling with packet 101 via an xCFH. Thus, for each ART and RT lookup, such an ART index may be used. However, it is assumed that an ART entry hash for packet 101 has not optionally been done.

Bridging and routing flow 138A is initiated at 301. At 302, a determination is made as to whether a MAC destination address of packet 101 matches an interface, such as IIF or OIF.

If a MAC destination address matches an interface for routing of packet 101, then at 303 a determination is made as to whether packet 101 contains a routable IP protocol, such as whether packet 101 is an IPv4 or IPv6 packet. If packet 101 does not contain a routable IP protocol, then packet 101 is sent to NPUsoft with an error condition, for example error condition 304, for processing by NPUsoft or dropping. If, however, packet 101 contains a routable IP protocol, such as IP version 4 ("IPv4") or IP version 6 ("IPv6"), then at 306 a determination is made as to whether routing is supported in hardware. If routing is not supported in hardware, then packet 101 is sent to NPUsoft with an error condition, for example error condition 307, for routing by NPUsoft as described below for example with respect to one or more of instantiations 314, 316 and 318.

At 314, a network layer ("layer-3") validity check is done, and an xCFH is marked to indicate this check has been done. If packet 101 is found to be invalid with respect to a layer-3 validity check at 314, then packet 101 is sent to NPUsoft with an error condition, for example error condition 315, for processing by NPUsoft or dropping.

If network layer validity is established, then at 316, IP options are checked, and an xCFH of packet 101 is marked to indicate that IP options have been checked. If IP options are unsupported or invalid, then packet 101 is sent to NPUsoft with an error condition, for example error condition 317, for processing by NPUsoft or dropping. If, however, all IP options are supported and valid, at 318 RT 900 is accessed looking for a match of an IP destination address for packet 101 as an entry in RT 900. If no match is found, then packet 101 is sent to NPUsoft with an error condition, for example error condition 319, for processing by NPUsoft, such as with a general routing table ("GRT") lookup. If, however, an IP Destination Address 901 is found in RT 900 matching an IP destination address of packet 101, an ART Index 601 stored in RT 900 in association with such IP Destination Address 901 is added to an xCFH of packet 101, and then routing and bridging flow 138A returns to address translation flow 100 at 399. Additionally, the TTL in the xCFH may be decremented. Notably, it should be appreciated that RT 900 is a compact routing table as compared with conventional routing tables. This compact nature of RT 900 facilitates using exact-match comparison of the packet's IP destination address against all the entries in RT 900, instead of a "longest" match (i.e., a longest-match algorithm for finding the GRT entry with the greatest number of most-significant bits ("MSBs") in common with the packet's IP destination address). Furthermore, if an exact match is found in RT 900, then all information for a next hop header is available. Accordingly, a next hop header may be built without having to resort to a GRT lookup. Alternatively, a MAC destination address search may be done in ART 800 for an exact match, and if an exact match is not found, the MAC destination address is stored in an xCFH of packet 101 and in RT 900.

If, however, at 302 a MAC destination address does not match an interface for bridging of packet 101, then at 305 a determination is made as to whether IP multicast routing is invoked and whether packet 101 is an IP multicast packet and not a broadcast packet. If both IP multicast routing is invoked and packet 101 is a multicast packet, then at 308 a determination is made as to whether an IP Source Address 902 in RT 900 matches an IP source address of packet 101. If no match of the IP source address is found, then packet 101 is sent to NPUsoft with an error condition, for example error condition 313, for processing by NPUsoft or dropping. If a match of the IP source address is found, then packet 101 is processed further as previously described starting at 314.

If, however, at 305, either IP multicast routing is not invoked or packet 101 is not a multicast packet, then checks for broadcasting of packet 101 are done beginning at 309 with a determination of whether bridging is supported in hardware. If bridging is not supported in hardware, then packet 101 is sent to NPUsoft with an error condition, for example error condition 310, for processing by NPUsoft as described below for example with respect to instantiation 311.

If bridging is supported in hardware, then at 311 ART 800 is accessed looking for a match of a MAC destination address for packet 101 as an entry in ART 800. If no match is found, then packet 101 is sent to NPUsoft with an error condition, for example error condition 312, for processing or dropping by NPUsoft. If, however, a MAC Destination Address 801 is found in ART 800 matching a MAC destination address of packet 101, an ART Index 601 stored in ART 800 in association with such MAC Destination Address 801 is added to an xCFH of packet 101, and then routing and bridging flow 138A returns to address translation flow 100 at 399.

Figure 3B:
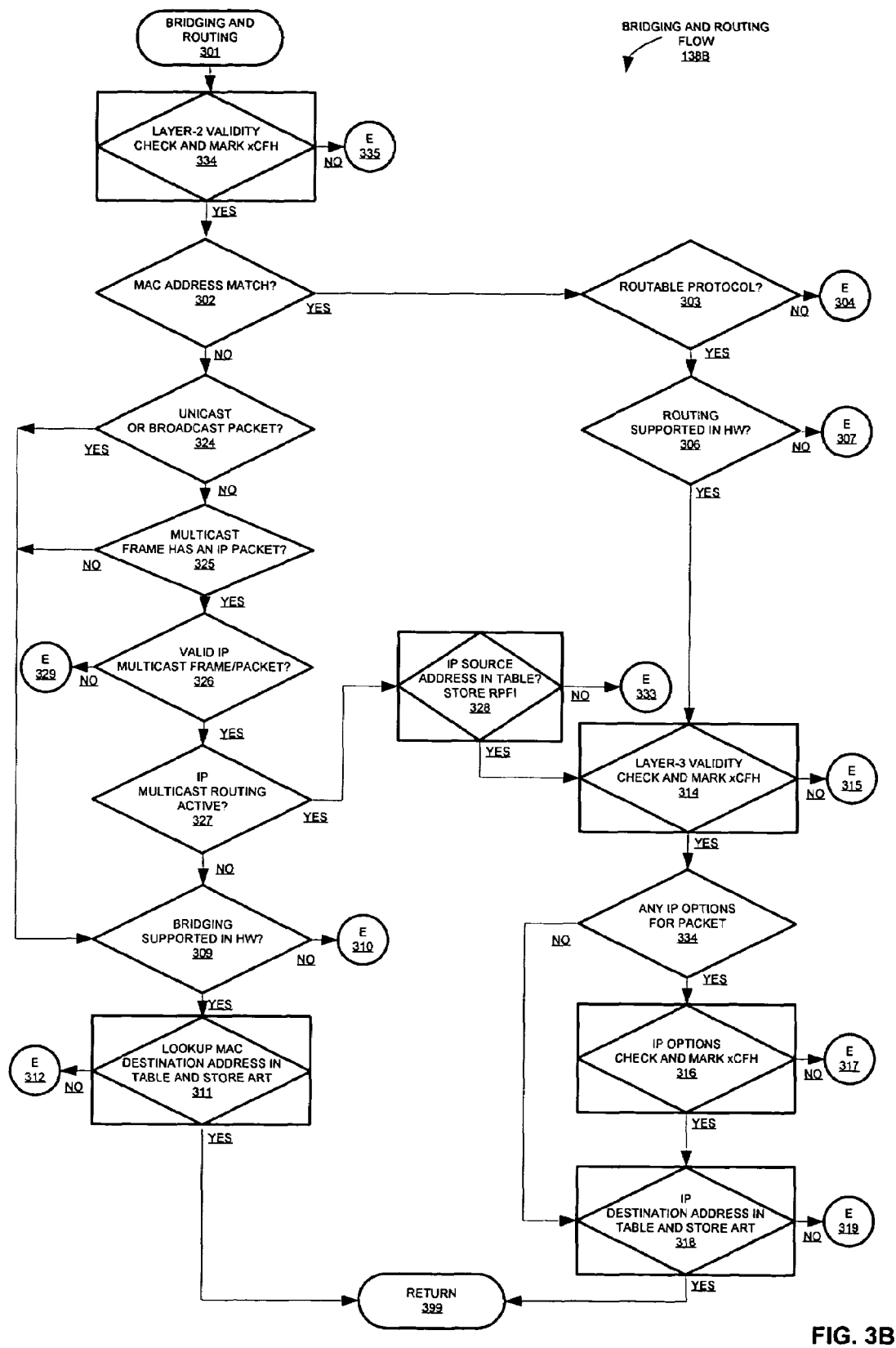

FIG. 3B is a flow diagram of an exemplary embodiment of a bridging and routing flow 138B. Much of bridging and routing flow 138B is the same as previously described bridging and routing flow 138A, and thus is not repeated. At 301 bridging and routing flow is initiated. At 334, a layer-2 validity check is done, and an xCFH of a packet is marked to indicate such check was done. Layer-2 validity checks may include: whether a MAC source address is a non-unicast source address; whether there is a length error in the MAC frame; and whether the cracker report indicates an error in the xCFH. If layer-2 for such a packet, for example, packet 101, is invalid, then an error condition 335 is sent to NPUsoft. Notably, operation 334 need not be done here, if previously done as part of NPU Mode A flow 140. If layer-2 for packet 101 is valid, then operation 302 for a MAC address match is done.

If there is no match at 302, at 324 a check as to whether packet 101 is a unicast or broadcast packet is made. If packet 101 is a unicast or broadcast packet, then previously described operations 309 and 311 may be done. Otherwise, at 325 it is determined whether this multicast frame, by process of elimination, has an IP packet. If there is no IP packet, then previously described operations 309 and 311 may be done. Otherwise, at 326 it is determined whether packet 101 is a valid IP multicast frame and packet. If packet 101 is found not to be valid at 326, then an error condition 329 is sent to NPUsoft. Otherwise, at 327 it is determined if multicast routing is active. If not active, then previously described operations 309 and 311 may be done. If multicast routing is active, then at 328 operation 308 is done with one addition, namely, storing a reverse path forwarding interface ("RFPi"). An RFPi is an interface on which a packet form a source of the packet would be expected for arrival, for example by looking up a source's IP address in a routing table and seeing if the interface on which the packet arrived was indeed the same interface that the router would use if it had to send a packet in the direction of the source of the packet that arrived. At 314, layer-3 validity is checked as previously described.

If there is no MAC address match at 302, operations 303, 306 and 314 may be done. From operation 314, an optional check to determine if packet 101 has any IP options may be made at 334. If there are no IP options, then operation 318 is done as previously described. If there are one or more IP options, then operations 316 and 318 may be done as previously described.

Notably, all broadcast frames for flow 138B are processed on the bridging path. Furthermore, ART entries may be setup such that NPUsoft gets a copy of each broadcast frame.

Figure 3C:
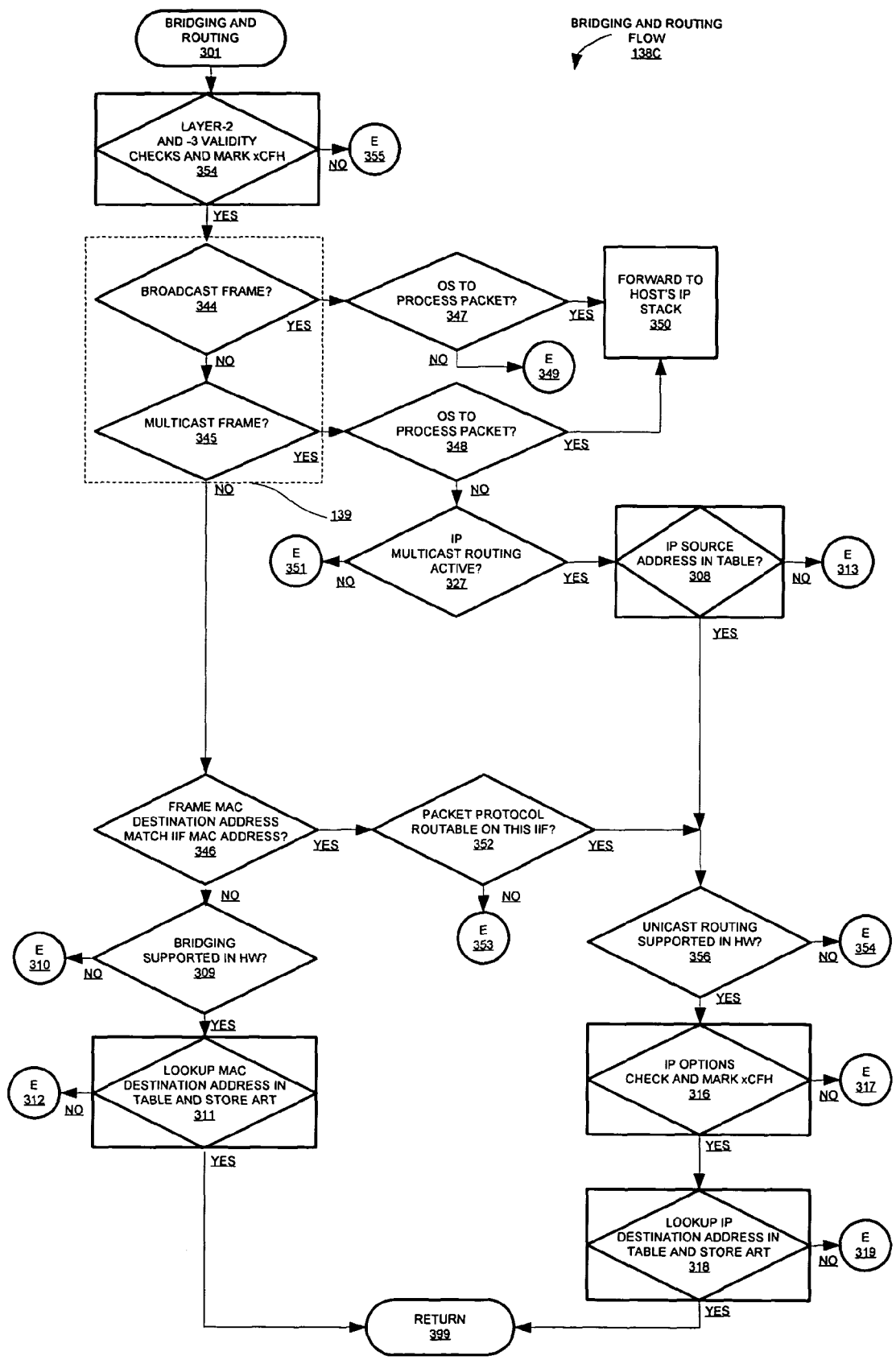

FIG. 3C is a flow diagram of an exemplary embodiment of a bridging and routing flow 138C. Much of bridging and routing flow 138C is the same as previously described bridging and routing flows 138A and 138B, and thus is not repeated. Routing and bridging flow 138C is initiated at 301. At 354, layer-2 and layer-3 validity checks are done. If layer-2 or layer-3 is invalid, an error condition 355 is sent to NPUsoft. Otherwise, at 344 it is determined whether the frame is a broadcast frame. If the frame for packet 101 is a broadcast frame, then at 347 it is determined whether the Operating System ("OS") is to process packet 101. If the OS is not to process packet 101, an error condition 349 is sent to NPUsoft. If, however, the OS is to process packet 101, then packet 101 is forwarded to an IP stack of the host device.

If, however, at 344 it is determined that a frame for packet 101 is not a broadcast frame, then at 345 it is determined whether the frame is a multicast frame. If it is determined that the frame is a multicast frame, then at 348 it is determined whether the OS is to process the packet. If the OS is to process packet 101, then packet 101 is forwarded to an IP stack of the host device. If the OS is not to process packet 101, then previously described operation 327 is done, except that if multicast routing is not active an error condition 351 is sent to NPUsoft. If multicast routing is active, then operation 308 is done. If a source address is found from operation 308, then at 356 it is determined whether unicast routing is supported in hardware, such as an NPU.

However, if at 345 it is determined that a frame for packet 101 is not a multicast frame, then at 346 it is determined whether a MAC destination address for the frame matches a MAC address of an IIF for packet 101. If there is no address match, then previously described operations 309 and 311 may be done. If there is an address match, then at 352 it is determined whether a protocol for packet 101 is routable on such an IIF. If this protocol is not a routable protocol for this IIF, then an error condition 353 is sent to NPUsoft. If this protocol is a routable protocol for this IIF, then at 356 it is determined whether unicast routing is supported in hardware, such as an NPU.

From 356, if it is determined that unicast routing is not supported in hardware, then an error condition 354 is sent to NPUsoft. Otherwise, previously described operations 316 and 318 may be done.

As mentioned above with reference to FIG. 2C, operations 146 could be incorporated into bridging and routing flow 138C, where operations 344 and 345 in combination provide operation 139 of FIG. 2C. Additionally, instead of having OS process packet 101, operations 141 and 143 may be done.

Figure 4A:
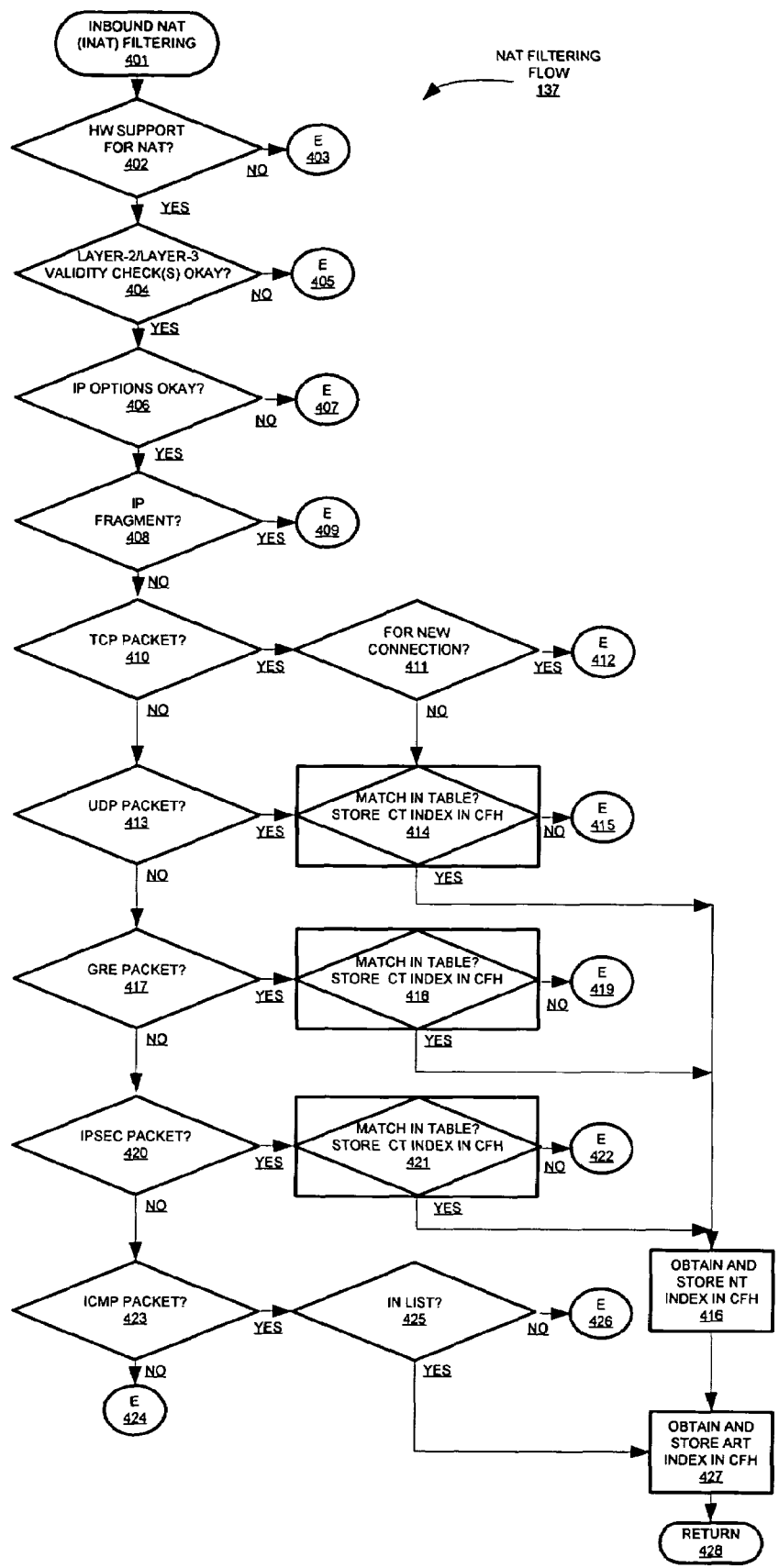
FIG. 4A is a flow diagram of an exemplary embodiment of a Network Address Translation ("NAT") filtering flow.

FIG. 4A is a flow diagram of an exemplary embodiment of an inbound NAT filtering flow 137. Inbound NAT filtering flow 137 is initiated at 401. At 402, a check for hardware support for NAT is made. If no such support is available, then packet 101 is sent to NPUsoft with an error condition, for example error condition 403, for processing by NPUsoft as described below. If, however, NAT processing is supported in hardware, then at 404 a layer-3 validity check is done. Notably, if layer-2 validity checking is not done as part of NPU mode A flow 140, then layer-2 validity is also checked at 404. For clarity, it is assumed that only layer-3 validity is checked at 404, though both layer-2 and layer-3 validity may be checked at 404 where both need to be valid to pass or where if one is invalid, an error condition indicating which or both of layers-2 and -3 is invalid is sent. If the layer-3 validity check comes back with an invalid condition, then packet 101 is sent to NPUsoft with an error condition, for example error condition 405, for processing or dropping by NPUsoft as an invalid packet. If layer-3 is valid, then at 406 an IP options check is done. If one or more IP options are unsupported or invalid, then packet 101 is sent to NPUsoft with an error condition, for example error condition 407, for processing by NPUsoft as having one or more unsupported or invalid IP options. If all IP options are supported and valid, then at 408 a check is made to determine if packet 101 is an IP fragment, namely, from a fragmented packet. If packet 101 is a fragment, then packet 101 is sent to NPUsoft with an error condition, for example error condition 409, for processing by NPUsoft. Notably, NPUsoft may employ "fragment absorption," where received fragment packets are all collected and reassembled, where possible, before being forwarded, as described in below.

If packet 101 is not a fragment, then it is determined what type of packet it is for further processing. If packet 101 is a TCP packet as found at 410, then at 411 it is determined if packet 101 is for a new connection. For example, if TCP state has synchronize ("SYN") equal to one, then this is for a new connection. If packet 101 is for a new connection, then packet 101 is sent to NPUsoft with an error condition, for example error condition 412, for processing by NPUsoft. Thus, NPUsoft will use information from packet 101 to build an entry in CT 600 and NT 700 prior to returning packet 101 to address translation flow 100.

If packet 101 is not for a new connection, or if at 410 packet 101 is found not to be a TCP packet but at 413 is found to be a UDP packet, then at 414, NT 700 is accessed to lookup an inbound five-tuple for packet 101. A hash of a five-tuple of packet 101 is done prior to this lookup, for example during building entries in CT 600 and in NT 700 for this packet 101 or a previous packet 101 for the same connection, a hash of a five-tuple may be stored in CT 600 and in NT 700 in association with such a five-tuple for cross-linking tables CT 600 and NT 700. Recall, packet 101 may be a remote or local inbound packet to the NPU. If the five-tuple for packet 101 is not in NT 700, then packet 101 is sent to NPUsoft with an error condition, for example error condition 415, for processing to build an entry in CT 600 and NT 700 prior to returning packet 101 to address translation flow 100, or for dropping by NPUsoft. If, however, the five-tuple for packet 101 is in NT 700, then at 414 a CT Index hashed from such a five-tuple of packet 101 is stored in an xCFH of packet 101. Processing of packet 101 processing proceeds at 416. At 416, an NT Index is obtained from CT 600 in association with a five-tuple entry matching that of packet 101 is stored in an xCFH of packet 101. This lookup in CT 600 is done with the recently obtained CT Index added to an xCFH of packet 101. As mentioned above, such an NT Index and a CT Index may be from a hash done in hardware or with NPUsoft when building a respective entry in NT 700 and CT 600 for a prior packet of this connection for packet 101. Furthermore, it should be appreciated that for NAT, translation is done by a gateway device between a remote computer and a local computer. Thus, to obtain an address and port number of a local computer for NAT, CT 600 is used, and to obtain an address and port number of a gateway device, NT 700 is used.

If packet 101 is not found to be a UDP packet at 413 but is found to be a GRE packet at 417, then at 418, NT 700 is accessed to lookup an inbound "five-tuple" for packet 101. By "five-tuple," is meant to include a GRE Call ID split into two data spaces turning a four-tuple into a pseudo-five-tuple. Thus, a five-tuple of packet 101 is used for this lookup. Thus, a GRE Call ID is used in part for this lookup. Recall, packet 101 may be a remote or local inbound packet to the NPU. If the five-tuple for packet 101 is not in NT 700, then packet 101 is sent to NPUsoft with an error condition, for example error condition 419, for processing or dropping by NPUsoft. If, however, the five-tuple for packet 101 is in NT 700, then at 418 a CT Index hashed from such a five-tuple is obtained from NT 700 and is stored in an xCFH of packet 101. Processing of packet 101 processing proceeds at 416. At 416, an NT Index is obtained from CT 600 in association with a five-tuple entry matching that of packet 101 is stored in an xCFH of packet 101. This lookup in CT 600 may be done using the recently obtained CT Index stored in an xCFH of packet 101. As mentioned above, such an NT Index and a CT Index may be from a hash done in hardware or with NPUsoft when building a respective entry in NT 700 and CT 600 for a prior packet of this connection.

If packet 101 is not found to be a GRE packet at 417 but is found to be an IPSec packet at 420, then at 421, NT 700 is accessed to lookup an inbound "five-tuple" for packet 101. By "five-tuple," is meant to include an SPI split into two data spaces turning a four-tuple into a pseudo-five-tuple. A five-tuple of packet 101 is used for this lookup. Thus, a SPI is used in part for this lookup. Recall, packet 101 may be a remote or local inbound packet to the NPU. If the five-tuple for packet 101 is not in NT 700, then packet 101 is sent to NPUsoft with an error condition, for example error condition 422, for processing to build an entry in CT 600 and NT 700 prior to returning packet 101 to address translation flow 100, or for dropping by NPUsoft. If, however, the five-tuple for packet 101 is in NT 700, then at 421 a CT Index hashed from such a five-tuple and looked up in NT 700 is stored in an xCFH of packet 101. Processing of packet 101 processing proceeds at 416. At 416, an NT Index is obtained from CT 600 in association with a five-tuple entry matching that of packet 101 is stored in an xCFH of packet 101. This lookup in CT 600 may be done using the recently obtained CT Index stored in an xCFH of packet 101. As mentioned above, such an NT Index and a CT Index may be from a hash done in hardware or with NPUsoft when building a respective entry in NT 700 and CT 600 for a prior packet of this connection.

If packet 101 is not found to be an IPSec packet at 420 or an Internet Control Message Protocol (ICMP) packet at 423, then packet 101 is sent to NPUsoft with an error condition, for example error condition 424, for processing to build an entry in CT 600 and NT 700 prior to returning packet 101 to address translation flow 100, or for dropping by NPUsoft. If packet 101 is not found to be an IPSec packet at 420 but is found to be an ICMP packet at 423, then at 425 a check is made to determine if packet 101 is on a list of supported ICMP packet types stored in memory, such as ICMP version 4 ("ICMPv4") and ICMP version 6 ("ICMPv6"). If packet 101 type is not on the list of supported ICMP packet types, then packet 101 is sent to NPUsoft with an error condition, for example error condition 426, for processing or dropping by NPUsoft. If packet 101 type is on the list of supported ICMP packet types, then processing of packet 101 proceeds at 427.

At 427, from 425 or from 416, an ART Index is stored in an xCFH of packet 101. The Art Index is obtained from CT 600 or NT 700, using a CT Index or NT Index, respectively, from an xCFH of packet 101 or is obtained from a five-tuple entry matching that of packet 101 in one of CT 600 or NT 700 for ICMP packets. At 428, inbound NAT filtering flow 137 returns to address translation flow 100. Notably, a hash for generating an ART Index may be of an entry or portion thereof in ART 800, and such a hash may be done when building an entry for packet 101 or a prior packet 101 for the same connection in ART 800.

Notably, a hash function computes a hash value based on a packet's five-tuple information, and this hash value is used as an index to NT 700. A hash function is the same for creating NT and CT indices. However, input to the hash function is not the same for creating CT index as it is for creating an NT index. In other words, an NT index uses public address information as part of the hash function input, and a CT index uses local address information as part of the hash function input instead of the public address information. However, a CT index may be created from local address information and stored in place of an NT index in CT 600 when NAT is not active.

Figure 4B:
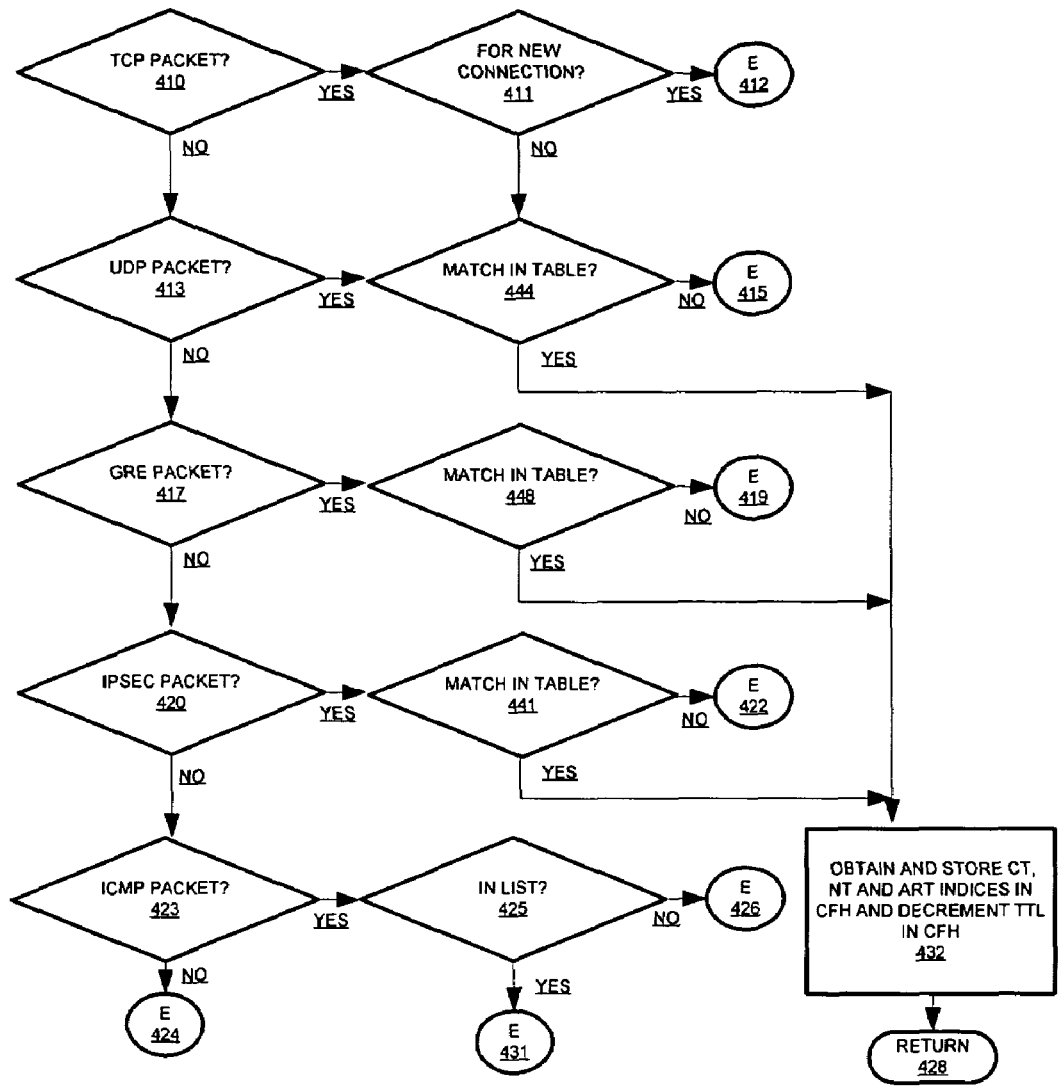
FIG. 4B is a flow diagram of an exemplary alternative embodiment of a portion of NAT filtering flow of FIG. 4A.

FIG. 4B is a flow diagram of an exemplary alternative embodiment of a portion of NAT filtering flow 137 of FIG. 4A. Rather than obtaining and storing a CT index at 414, 418 and 421 as in FIG. 4B, no CT index is obtained and stored at corresponding blocks 444, 448 and 441. Rather, at 428, CT, NT and ART indices are obtained and stored in CFHs of packet 101. Additionally, "Time To Live" ("TTL") in CFH is decremented at 432. Another difference from the flow of FIG. 4A, is that rather than obtaining and storing an ART index for an ICMP packet on the list at 425, an error or state condition is sent at 431 to NPUsoft. As the remainder of FIGS. 4A and 4B are the same, the description is not repeated.

Figure 5A:
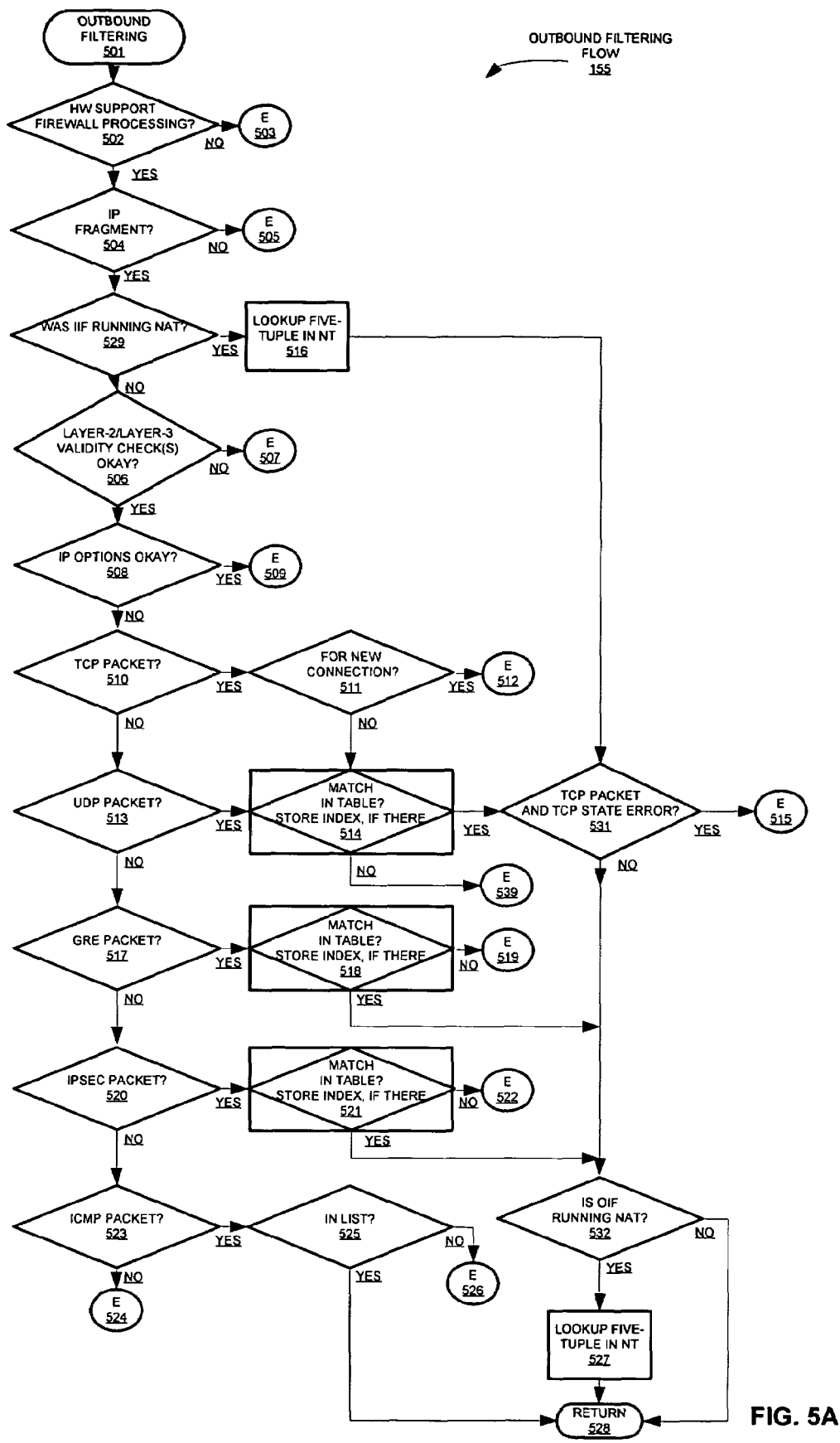
FIGS. 5A and 5B are flow diagram of a respective exemplary embodiment of outbound filtering flows.

FIG. 5A is a flow diagram of an exemplary embodiment of an outbound filtering flow 155. Much of outbound filtering flow 155 is similar to inbound NAT filtering flow 137, and thus is not repeated here. Outbound filtering flow 155 is initiated at 501. At 502, a check for hardware support for firewall processing is made. If no such support is available, then packet 101 is sent to NPUsoft with an error condition, for example error condition 503, for processing by NPUsoft as described below.

If, however, firewall processing is supported in hardware, then at 504 a check is made to determine if packet 101 is an IP fragment, namely, from a fragmented packet. If packet 101 is a fragment, then packet 101 is sent to NPUsoft with an error condition, for example error condition 505, for processing by NPUsoft. Notably, NPUsoft may employ "fragment absorption," where received fragment packets are all collected and reassembled, where possible, before being forwarded, as described below.

If, however, packet 101 is not an IP fragment, then at 529 a check is made to determine if the IIF for packet 101 was running NAT. If the IIF was running NAT, then at 516 an NT Index is obtained from an xCFH of packet 101 to find a five-tuple in NT 700. Alternatively, a CT Index may be obtained from an xCFH of packet 101 to obtain a five-tuple from CT 600, if stored therein. After which, processing of packet 101 continues at 531, as described below.

If, however, at 529, the IIF of packet 101 was not running NAT, then at 506 a layer-3 validity check is done. Notably, if layer-2 validity checking is not done as part of NPU mode A flow 140, then layer-2 validity is also checked at 506. For clarity, it is assumed that only layer-3 validity is checked at 506, though both layer-2 and layer-3 validity may be checked at 506 where both need to be valid to pass or where if one is invalid, an error condition indicating which or both of layers-2 and -3 is invalid is sent. If the layer-3 validity check comes back with an invalid condition, then packet 101 is sent to NPUsoft with an error condition, for example error condition 507, for processing or dropping by NPUsoft as an invalid packet. If layer-3 is valid, then at 508 an IP options check is done. If one or more IP options are unsupported or invalid, then packet 101 is sent to NPUsoft with an error condition, for example error condition 509, for processing by NPUsoft as having one or more unsupported or invalid IP options.

If all IP options are supported and valid at 508, then a check is made at 510 to determine if packet 101 is a TCP packet. If packet 101 is determined to be a TCP packet, then at 511 it is determined if packet 101 is for a new connection (i.e., SYN equal to 1). If packet 101 is for a new TCP connection or new "handshake," then packet 101 is sent to NPUsoft with an error condition, for example error condition 512, for processing to build an entry in CT 600 prior to returning packet 101 to address translation flow 100. If packet 101 is not for a new TCP connection, or if at 510 packet 101 is found not to be a TCP packet but at 513 is found to be a UDP packet, then at 514 a check for an NT Index, such as from a prior hash of a five-tuple for packet 101 or a prior packet for the same connection, is made by doing a CT 600 lookup for an outbound five-tuple matching the five-tuple of packet 101. Recall, packet 101 may be a remote or local outbound packet to the NPU. If the five-tuple for packet 101 is not in CT 600, then packet 101 is sent to NPUsoft with an error condition, for example error condition 539, for processing to build an entry in CT 600 prior to returning packet 101 to address translation flow 100, or for dropping by NPUsoft. If, however, the five-tuple for packet 101 is in CT 600, then at 514 an NT Index hashed from such a five-tuple is stored in an xCFH of packet 101, provided such an NT Index is present in CT 600. Notably, if a firewalling-only mode is being used, namely, a mode without any NAT, then no NT index will be present in CT 600. Processing of packet 101 processing proceeds at 531.

At 531, a check is made to determine or confirm (as it may have previously been determined at 510 that packet 101 is a TCP packet) as applicable, if packet 101 is a TCP packet and if packet 101 has a TCP state error. A TCP error results when state of a packet does not match the state of a connection associated with the packet. Notably, the check at 531 is inapplicable to UDP packets as they just flow through 531. Furthermore, TCP state tracking as described below, or a subset thereof, may be used for TCP state error check 513. If packet 101 is a TCP packet and has a TCP state error, then packet 101 is sent to NPUsoft with an error condition, for example error condition 515, for processing or dropping by NPUsoft. If, however, at 531 either packet 101 is not a TCP packet or does not have a TCP state error, then processing of packet 101 proceeds at 532, as described below.

If packet 101 is not found to be a UDP packet at 513 but is found to be a GRE packet at 517, then at 518, CT 600 is accessed with a five-tuple from packet 101 to lookup an outbound five-tuple for packet 101. Recall, packet 101 may be a remote or local outbound packet to the NPU, and part of the five-tuple is a GRE Call ID. If the five-tuple for packet 101 is not in CT 600, then packet 101 is sent to NPUsoft with an error condition, for example error condition 519, for processing to build an entry in CT 600 prior to returning packet 101 to address translation flow 100, or for dropping by NPUsoft. If, however, the five-tuple for packet 101 is in CT 600, then at 518 an NT Index, hashed from such a five-tuple, is obtained from CT 600 if present and is stored in an xCFH of packet 101. Processing of packet 101 proceeds at 532, as described below.

If packet 101 is not found to be a GRE packet at 517 but is found to be an IPSec packet at 520, then at 521, CT 600 is accessed with a five-tuple of packet 101 to lookup an outbound five-tuple for packet 101. Recall, packet 101 may be a remote or local outbound packet to the NPU, part of the five-tuple is an SPI. If the five-tuple for packet 101 is not in CT 600, then packet 101 is sent to NPUsoft with an error condition, for example error condition 522, for processing to build an entry in CT 600 prior to returning packet 101 to address translation flow 100, or for dropping by NPUsoft. If, however, the five-tuple for packet 101 is in CT 600, then at 521 an NT Index, hashed from such a five-tuple, is obtained from CT 600 if present and is stored in an xCFH of packet 101. Processing of packet 101 proceeds at 532, as described below.

At 532, a check is made to determine if the OIF of packet 101 is running NAT. If the OIF of packet 101 is not running NAT, at 528 outbound filtering flow 155 returns to address translation flow 100. If, however, the OIF of packet 101 is running NAT, then at 527 an entry in NT 700 is accessed using an NT Index obtained from an xCFH of packet 101. After which, at 528 outbound filtering flow 155 returns to address translation flow 100.

If packet 101 is not found to be an IPSec packet at 520 or an ICMP packet at 523, then packet 101 is sent to NPUsoft with an error condition, for example error condition 524, for processing or dropping by NPUsoft. If packet 101 is not found to be an IPSec packet at 520 but is found to be an ICMP packet at 523, then at 525 a check is made to determine if packet 101 is on a list of supported ICMP packet types stored in memory, such as ICMPv4 and ICMPv6. If packet 101 type is not on the list of supported ICMP packet types, then packet 101 is sent, for example to NPUsoft, with an error condition, for example error condition 526, for allowing such a packet to pass through or to be dropped. Notably, if an ICMP packet type is not on the list, the default may be to drop the packet or to allow the packet to pass through the NPU, which outcome may be dependent on the type of ICMP packet. If packet 101 type is on the list of supported ICMP packet types, at 528 outbound filtering flow 155 returns to address translation flow 100.

Notably, by using indices stored in an xCFH of a packet, information is handed down from inbound filtering to outbound filtering. This is particularly useful when NAT is being used, where outbound filtering is substantially simplified by having access to an index to NT 700. Furthermore, it should be appreciated that ordering of the steps may be altered. For example, a check for an ICMP packet type at 423 or 523 may be done prior to checking for any other packet type. However, as NAT inbound and outbound filtering is not supported for ICMP error packet payloads, doing ICMP toward the end makes sense.

Figure 5B:
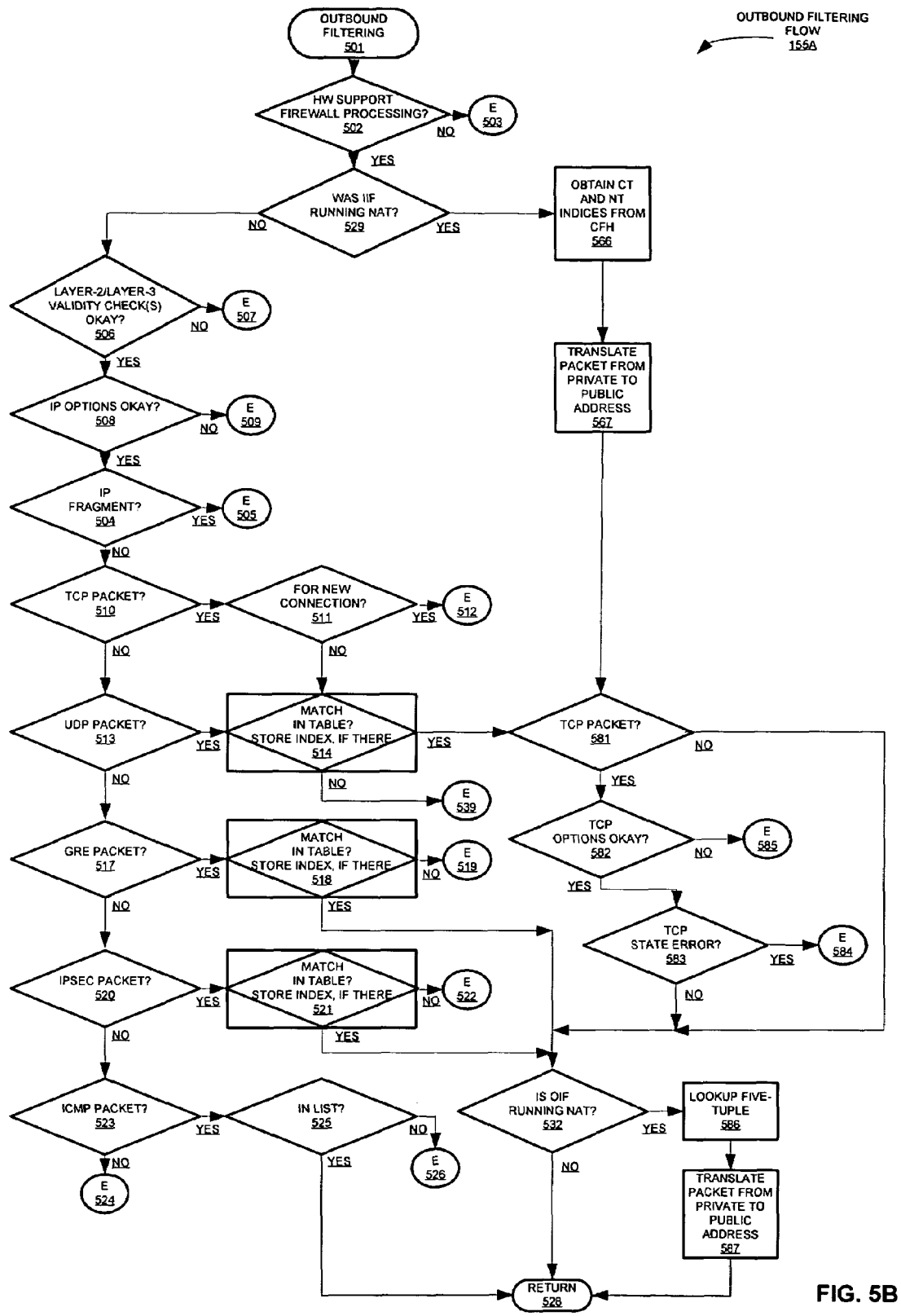

FIG. 5B is a flow diagram of an exemplary embodiment of an outbound filtering flow 155A. Much of outbound filtering flow 155A is similar to outbound filtering flow 155, and thus much not repeated here. Outbound filtering is initiated at 501. At 502, it is determined if firewall processing is supported in hardware. At operation 529, it is determined whether an IIF is running NAT. If the IIF is not running NAT, then operations 506, 508 and 504 are done as previously described. Packet processing operations for non-NAT inbound filtering are the same as for outbound filter flow 155, except that output from operation 514 for a match is processed differently, namely, if a match is found in a CT 600 at 514, then at 581 it is determined whether packet 101 is a TCP packet. Additional details are provided below for post operation 581 processing.

If, at 529, an IIF is running NAT, then at 566 CT and NT indices are obtained from CFHs for packet 101. At 567, packet 101 is translated from a local or private address to a gateway or public address using information obtained from CT 600 and NT 700 lookups using CT and NT indices to obtain local, public and remote address information. At 581, it is determined whether packet 101 is a TCP packet.

If, at 581, packet 101 is found not to be a TCP packet, then at 532 it is determined if an OIF is running NAT. If the OIF is running NAT, then at 586 a five-tuple is looked up using an NT index from a CFH of packet 101 to do the NT 700 lookup. A CT index is obtained from NT 700 during the NT index lookup and stored in a CFH for packet 101, if not already present in the CFH for packet 101. At 587, packet 101 is translated from a local or private address to a gateway or public address using information obtained from CT 600 and NT 700 lookups using CT and NT indices to obtain local, public and remote address information. After which, outbound filtering flow 155A returns at 528. Additionally, if the OIF is not running NAT, then outbound filtering flow 155A returns at 528.

If, however, at 581 packet 101 is found to be a TCP packet, then at 582 TCP options are checked. If TCP options are not okay, an error condition 585 is sent to NPUsoft. If TCP options are okay, then at 583 a check is made for a TCP state error. If there is a TCP state error, an error condition 584 is sent to NPUsoft. If there is no TCP state error, then a check for the OIF running NAT at 532 is made as previously described.

Figure 10:
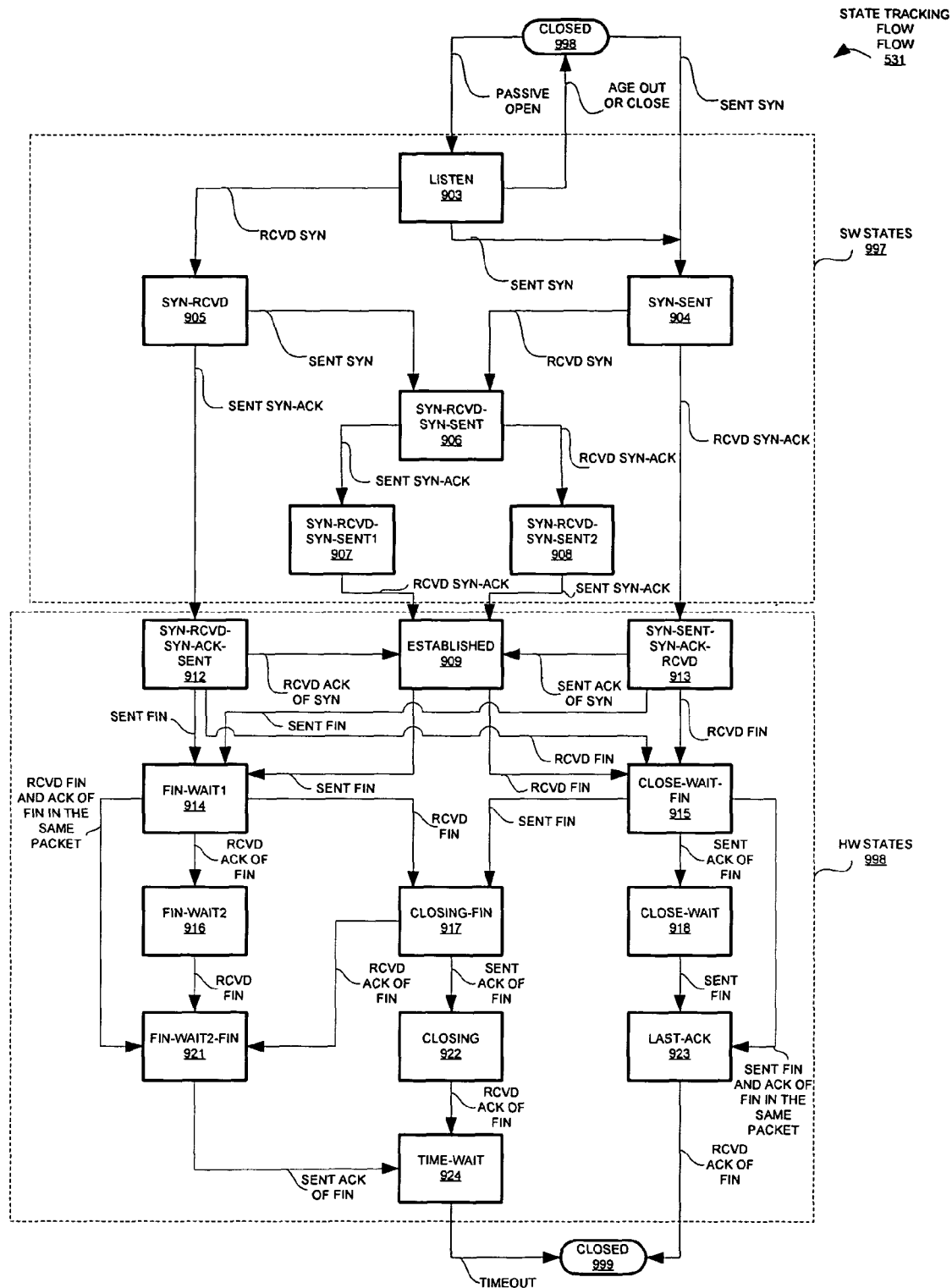
FIG. 10 is a state transition diagram of an exemplary embodiment of a state tracking flow.

FIG. 10 is a state transition diagram of an exemplary embodiment of a state tracking flow 531 for tracking a packet. State tracking flow is described in terms of well-known code bits for TCP state transitions, such as Synchronize ("SYN"), Acknowledge ("ACK"), Reset ("RST"), Finished ("FIN"), and Received ("RCVD"), among others. State tracking flow 531 may be implemented in hardware or software, including a combination thereof, in the form of a state machine. State tracking flow 531 starts in a CLOSED state 998, from which a passive open causes a transition to LISTEN state 903 or from which a sent SYN cause a transition to SYN-SENT state 904. From LISTEN state 903, transitioning to CLOSED state 998 occurs responsive to an age out or close condition. Notably, an RST received (not shown) within a valid receive window or sent out within a valid send window causes a transition to a CLOSED state 998 or 999.

From LISTEN state 903, transitioning to SYN-RCVD state 905 occurs responsive to a received SYN. From LISTEN state 903, transitioning to SYN-SENT state 904 occurs responsive to a sent SYN.

From SYN-RCVD state 905, transitioning to SYN-RCVD-SYN-SENT state 906 occurs responsive to a sent SYN, and transitioning to SYN-RCVD-SYN-ACK-SENT state 912 occurs responsive to a sent SYN-ACK.

From SYN-SENT state 904, transitioning to SYN-RCVD-SYN-SENT state 906 occurs responsive to a received SYN, and transitioning to SYN-SENT-SYN-ACK-RCVD state 913 occurs responsive to a received SYN-ACK.

From SYN-RCVD-SYN-SENT state 906, transitioning to SYN-RCVD-SYN-SENT1 state 907 occurs responsive to a sent SYN-ACK, and transitioning to SYN-RCVD-SYN-SENT2 state 908 occurs responsive to a received SYN-ACK.

From SYN-RCVD-SYN-SENT1 state 907, transitioning to a connection ESTABLISHED state 909 occurs responsive to a received SYN-ACK. From SYN-RCVD-SYN-SENT2 state 908, transitioning to ESTABLISHED state 909 occurs responsive to a sent SYN-ACK.

From SYN-RCVD-SYN-ACK-SENT state 912, transitioning to ESTABLISHED state 909 occurs responsive to a received ACK of a SYN. From SYN-SENT-SYN-ACK-RCVD state 913, transitioning to ESTABLISHED state 909 occurs responsive to a sent ACK of a SYN.

From ESTABLISHED state 909, SYN-RCVD-SYN-ACK-SENT state 912 or SYN-SENT-SYN-ACK-RCVD state 913, transitioning to FIN-WAIT1 state 914 occurs responsive to a sent FIN. From ESTABLISHED state 909, SYN-RCVD-SYN-ACK-SENT state 912 or SYN-SENT-SYN-ACK-RCVD state 913, transitioning to CLOSE-WAIT-FIN state 915 occurs responsive to a received FIN.

From FIN-WAIT1 state 914, transitioning to: CLOSING-FIN state 917 occurs responsive to a received FIN; FIN-WAIT2 state 916 occurs responsive to a received ACK of a FIN, and transitioning to FIN-WAIT2-FIN state 921 occurs responsive to a received FIN and a received ACK of the FIN in the same packet.

From CLOSE-WAIT-FIN state 915, transitioning to: CLOSING-FIN state 917 occurs responsive to a sent FIN; CLOSE-WAIT state 918 occurs responsive to a sent ACK of a FIN, and transitioning to LAST-ACK state 923 occurs responsive to a sent FIN and a sent ACK of the FIN in the same packet.

From FIN-WAIT2 state 916, transitioning to FIN-WAIT2-FIN state 921 occurs responsive to a received FIN. From CLOSE-WAIT state 918, transitioning to LAST-ACK state 923 occurs responsive to a sent FIN.

From CLOSING-FIN state 917, transitioning to FIN-WAIT2-FIN state 921 occurs responsive to a received ACK of a FIN, and transitioning to CLOSING state 922 occurs responsive to a sent ACK of a FIN.

From CLOSING state 922, transitioning to TIME-WAIT state 924 occurs responsive to a received ACK of a FIN. From FIN-WAIT2-FIN state 921, transitioning to TIME-WAIT state 924 occurs responsive to a sent ACK of a FIN.

From LAST-ACK state 923, transitioning to CLOSED state 999 occurs responsive to a received ACK of a FIN. From TIME-WAIT state 924, transitioning to CLOSED state 999 occurs responsive to a timed out condition.

For a hardware and software embodiment, CLOSED states 998 and 999 are hardware and software states. States within dashed-box 997 are software states, and states with dashed-box 996 are hardware states.

Figure 12A:
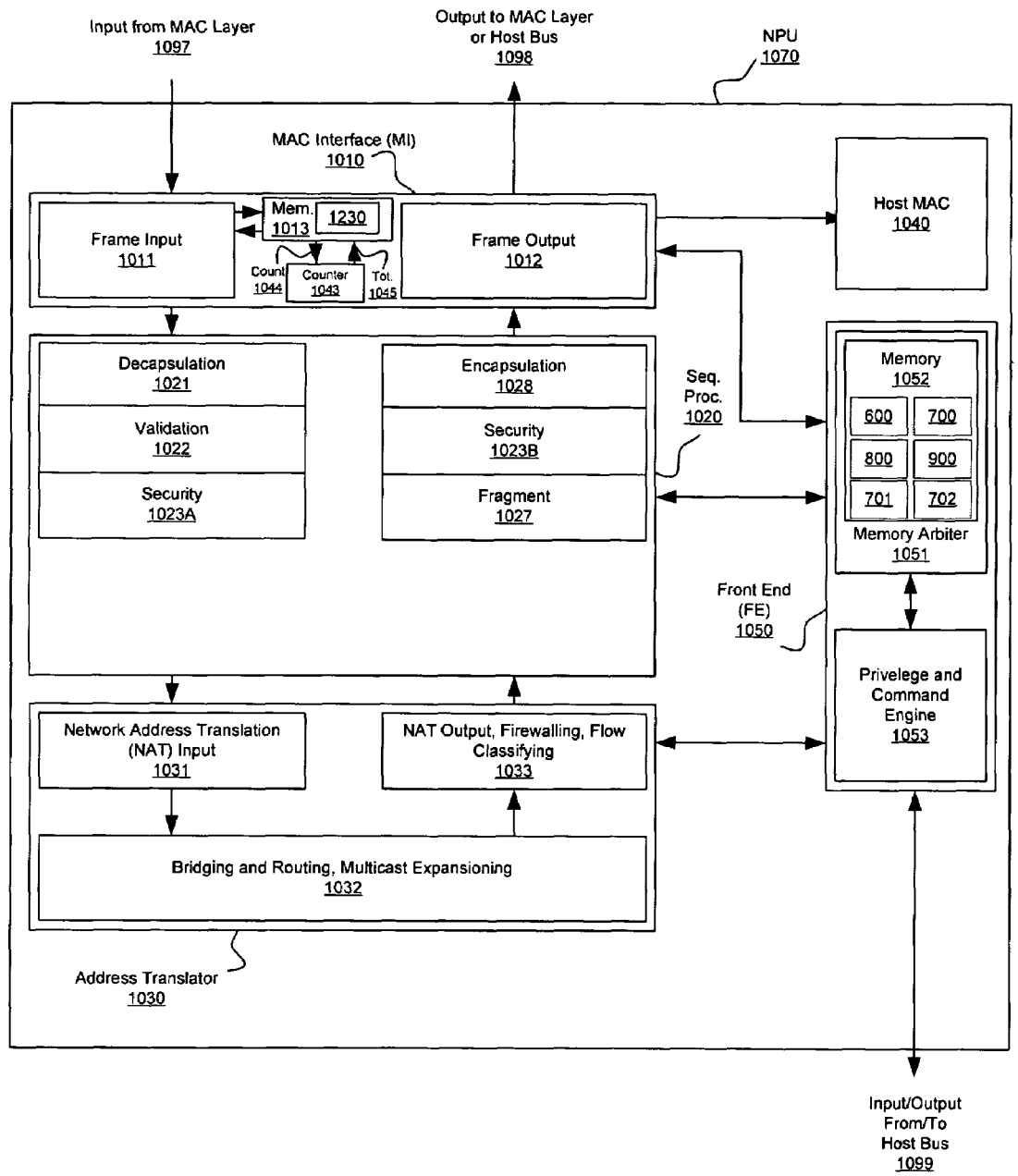
FIG. 12A is a block diagram of an exemplary embodiment of a network processor unit ("NPU").

Referring to FIG. 12A, there is shown a block diagram of an exemplary embodiment of a NPU 1070. NPU 1070 comprises MAC interface ("MI") 1010, sequence processor 1020, address translator 1030, host MAC 1040, and front end 1050. NPU 1070 micro architecture uses a hardwired pipeline without a central processing unit ("CPU") core. A network driver program, including a software or data portion of address translation flow 100, may be stored in system memory. Such a network driver program and NPU 1070 communicate with one another using commands via push buffers ("PBs"), namely, a command buffer going from software to NPU or NPU to software, as described in additional detail below.

Input from MAC layer 1097 and output to MAC layer or host bus 1098 may be in a form compatible with one or more of Ethernet 10/100/1000 mega-bits-per-second ("Mbps") ("IEEE 802.3") for local area network ("LAN") connectivity, Home Phoneline Network Alliance ("HomePNA" or "HPNA"), wireless local area network ("WLAN") ("IEEE 802.11"), and a digital signal processor ("DSP") MAC layer, among others. Though a personal computer workstation embodiment is described herein, it should be understood that NPU 1070 may be used in other known devices for network connectivity, including, but not limited to, routers, switches, gateways, and the like. Furthermore, a host or local bus may be a Fast Peripheral Component Interconnect ("FPCI") bus; however, other buses, whether directly accessed or coupled to a host bus, include, but are not limited to, Peripheral Component Interconnect ("PCI"), 3GIO, Video Electronic Standards Association ("VESA), VersaModule Eurocard ("VME"), Vestigial Side Band ("VSB"), Accelerated Graphics Port ("AGP"), Intelligent I/O ("I2O"), Small Computer System Interface ("SCSI"), Fiber Channel, Universal Serial Bus ("USB"), IEEE 1394 (sometimes referred to as "Firewire," "iLink" and "Lynx"), Personal Computer Memory Card International Association ("PCMCIA"), and the like.

NPU 1070 receives a frame input from MAC layer 1097. This frame flows through NPU 1070's pipeline, starting with MAC interface 1010. MAC interface 1010 receives one or more frame inputs 1011. MAC interface 1010 is coupled to front end 1050 for access to memory 1052 via memory arbiter 1051. Notably, memory 1052 may be memory local to NPU 1070 or system memory of a host system. Frame inputs 1011 are processed in part by placing them into staging buffers in cache memory 1013. If capacity of staging buffers is exceeded or downstream NPU 1070 pipeline is blocked, spill over frames are queued in memory 1052.

Frame inputs 1011 have a respective CFH added to the beginning of a frame to indicate its type and input MAC index. Notably, handling of frame inputs 1011 can depend at least in part on frame type. For example, WLAN management frames and like frame types have their CFH marked for being passed directly to Host MAC 1040, while other frames are passed to sequence processor 1020.

For purposes of clarity of explanation, processing of one frame through NPU 1070 pipeline will be described, though it should be understood that multiple frames may be pipeline-processed through NPU 1070. Lookup tables in memory 1052 may include state tables 600, 700, 800, and 900, as described above, as well as a list of supported ICMP types 1071. Supported ICMP types may be loaded from a network driver program. Sequence processor 1020 on an inbound side may include a decapsulation module 1021, a validation module 1022 and a security module 1023A.

Address translator 1030 provides NAT for converting public IP addresses to private IP addresses. However, if a packet is from a LAN, then conventionally no address translation is done. Rather, NAT is done for a packet communicated over a wide area network ("WAN"), including, but not limited to, a portion of the Internet. Security modules for incoming and outgoing packets 1023A and 1023B, respectively, may be instantiated in sequence processor 1020. For example, IPSec may be used with NAT as describe in a co-pending U.S. patent application entitled "METHOD AND APPARATUS FOR SECURITY PROTOCOL AND ADDRESS TRANSLATION INTEGRATION" by Thomas A. Maufer, Sameer Nanda, and Paul J. Sidenblad, filed Jun. 13, 2002, application Ser. No. 10/172,352, which is incorporated by reference as though fully set forth herein.

Bridging and routing module 1032 includes multicast expansioning. After a lookup in CT 600 or NT 700, a routing table lookup from memory 1052 is done for an Address Resolution Protocol ("ARP") table 702 to convert an IP address for a packet into a physical address. Moreover, if more than one output MAC address is specified, then multicast expansioning is done. Notably, at this point a packet may be output for use by a host computer user. Routing from address translator 1030 for a packet may be for sending such a packet.

In addition to NAT, firewalling may be done with NAT output, firewall screening and flow classification module 1033, namely, review header fields, classify packets in lookup tables in cache memory, mark CFH with per-MAC output first-in first-out ("FIFO") index, new priority, and a new ToS, among other previously described events.

Packets processed on an outbound side of sequence processor 1020 may be processed through one or more of fragment module 1027, security module 1023B and encapsulation module 1028. One or more packets are provided as multiple frames for each packet from sequence processor 1020 to MAC interface 1010 as frame output 1012. MAC interface 1010 writes a frame from sequence processor 1020 to one or more staging buffers in cache memory 1013. If MAC interface 1010 does not have priority to do such writing to cache memory 1013 due to flow scheduling, such frame is spilled over to memory 1052. Frame output 1012, once scheduled, is output-to-output MAC layer or host bus 1098.

NPU 1070 may form a portion of an intelligent network interface (sometimes referred to as a "network interface card" or "NIC"), and thus NPU 1070 may be used to do computationally intensive network stack operations rather than using a host CPU. This frees up a host CPU for other activities: Additionally, a privileged and command engine 1053 may be included with FE 1050 and coupled to a host via an input/output ("I/O") interface 1099 for direct access to and from NPU 1070 by a host system. Other details regarding NPU 1070 may be found in the co-pending patent application entitled "METHOD AND APPARATUS FOR PERFORMING NETWORK PROCESSING FUNCTIONS" by Robert A. Alfieri, Gary D. Hicok, Paul J. Sidenblad, filed Dec. 13, 2002, application Ser. No. 10/319,791, assigned to the same assignee as this patent application, which is incorporated by reference as though fully set forth herein.

Notably, memory 1013 may be coupled to frame input 1011 for buffering packets for a respective connection. For example, in Voice-Over IP ("VOIP"), UDP is used to send many packets at a time. VOIP is a low latency application where packets are order specific. Accordingly, memory 1013 can buffer overflow packets, and increment counter 1043 via count signal 1044. As packets are processed out of memory 1013, count signal 1044 is used to decrement counter 1043. When counter 1043 is down to zero, as indicated by total signal 1045, then all packets in memory 1013 for a connection have been sent out of memory 1013. Notably, multiple counts may be maintained for supporting multiple connections.

Figure 12B:
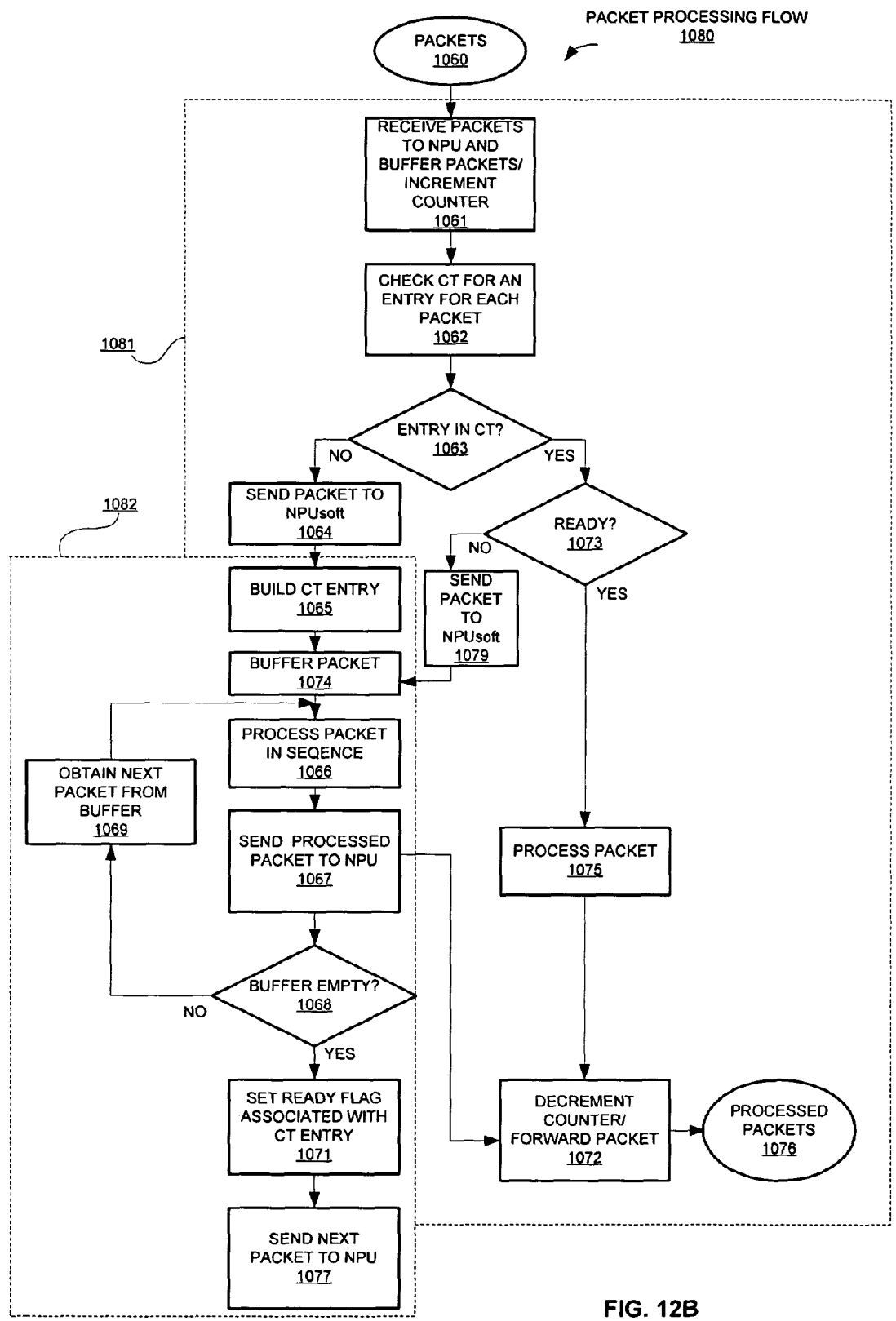
FIG. 12B is a flow diagram of an exemplary embodiment of a packet processing flow for processing bursts of packets.

Referring to FIG. 12B, there is shown a flow diagram of an exemplary embodiment of a packet processing flow 1080 for processing bursts of packets. A VOIP session may generate an exemplary burst of UDP packets. With continued reference to FIG. 12B and renewed reference to FIGS. 6 and 12A, processing of packets when burst of packets are received is further described.

Packets 1060 are serially received at 1061 to an NPU, such as NPU 1070. At 1061, packets 1060 are buffered into memory 1013 and a counter 1043 is increment for each packet buffered. At 1062, each received packet is checked for an entry in CT 600.

If at 1063 it is determined that no entry in CT 600 exists for a packet, then such a packet is sent to NPUsoft at 1064. Notably, a CT index may be obtained from an xCFH or CFH for this lookup. At 1065, a packet to be processed with NPUsoft is buffered, and NPUsoft builds a CT entry for such a packet. Notably, though separate buffers are described for a software portion 1082 and a hardware portion 1081, a single buffer may be used for both. Notably, a first packet, for example for a VOIP connection, may be used to build such a CT entry, and subsequent packets for such VOIP connection would therefore not need to have another CT entry built. If, however, at 1063 it is determined that an entry for such a packet is in CT 600, then at 1073 it is determined if such a CT entry has a ready status flag set. If at 1073 it is determined that a ready status flag is not set, then such a packet is sent to NPUsoft at 1079.

Suppose that packets 1 through N, for N a positive integer, are buffered at 1074. Notably, if a ready status flag is not in place for subsequently received packets N+1, and so on, such packets are sent to NPUsoft for processing, until all packets buffered at 1074 have been cleared, as described below in additional detail.

A first packet of the sequence is obtained for processing at 1066, followed by a second packet of the sequence, and so on and so forth. This is because UDP packets, such as VOIP packets, may need to be played back in sequence. At 1067, a processed packet is sent to an NPU at 1072. Notably, NPUsoft may fully process a packet or leave some portion of packet processing for an NPU. However, in this embodiment, the NPU processes the packet in its entirety. If the NPUsoft submitted a packet to hardware, a hash of the packet's five-tuple would lead to a CT entry that was marked as "not ready," and such a packet would come right back to the software. Accordingly, the NPUsoft completely processes each of these packets and sends them out marked such that they bypass the NPU. In other embodiments, the NPUsoft may be able to process packets sufficiently to create sufficient CT or NT state so that such processed packets may then be re-submitted to the NPU to complete the processing. At 1068, NPUsoft checks for another packet in the buffer to process. If there is another packet to process, then at 1069 such other packet is obtained from buffer memory for processing.

If there are no more packets to process at 1068, then a ready status flag is set at 1071 for an associated CT entry, such as for a VOIP connection. Accordingly, subsequently received packets will have a CT entry at 1063 and a ready status flag set at 1073, and thus such packets will be processed by NPU at 1075.

After a packet is processed at 1075, it is forwarded along from NPU at 1072 as a processed packet 1076. As each packet is forwarded, such packet is removed from buffer memory 1013 and counter 1043 is decremented. Once all packets sent for processing by NPUsoft are processed, counter 1043 is zeroed as indicated by total count signal 1045. Thus, NPU 1070 will know when all packets, such as for such a VOIP connection, sent to NPUsoft have been completely processed, and will know when all packets in buffer memory 1013 have been processed.

Thus, it should be understood that a state is created in software for hardware to process packets. However, this state is not activated for use until all packets received to software have been processed out of software. However, once all such packets have been processed out of software, then hardware may be used for real-time traffic. Though entries for CT 600 may pass from NPUsoft to NPU 1070 for writing to CT 600, tables may be created in software and maintained by software.

Figure 13:
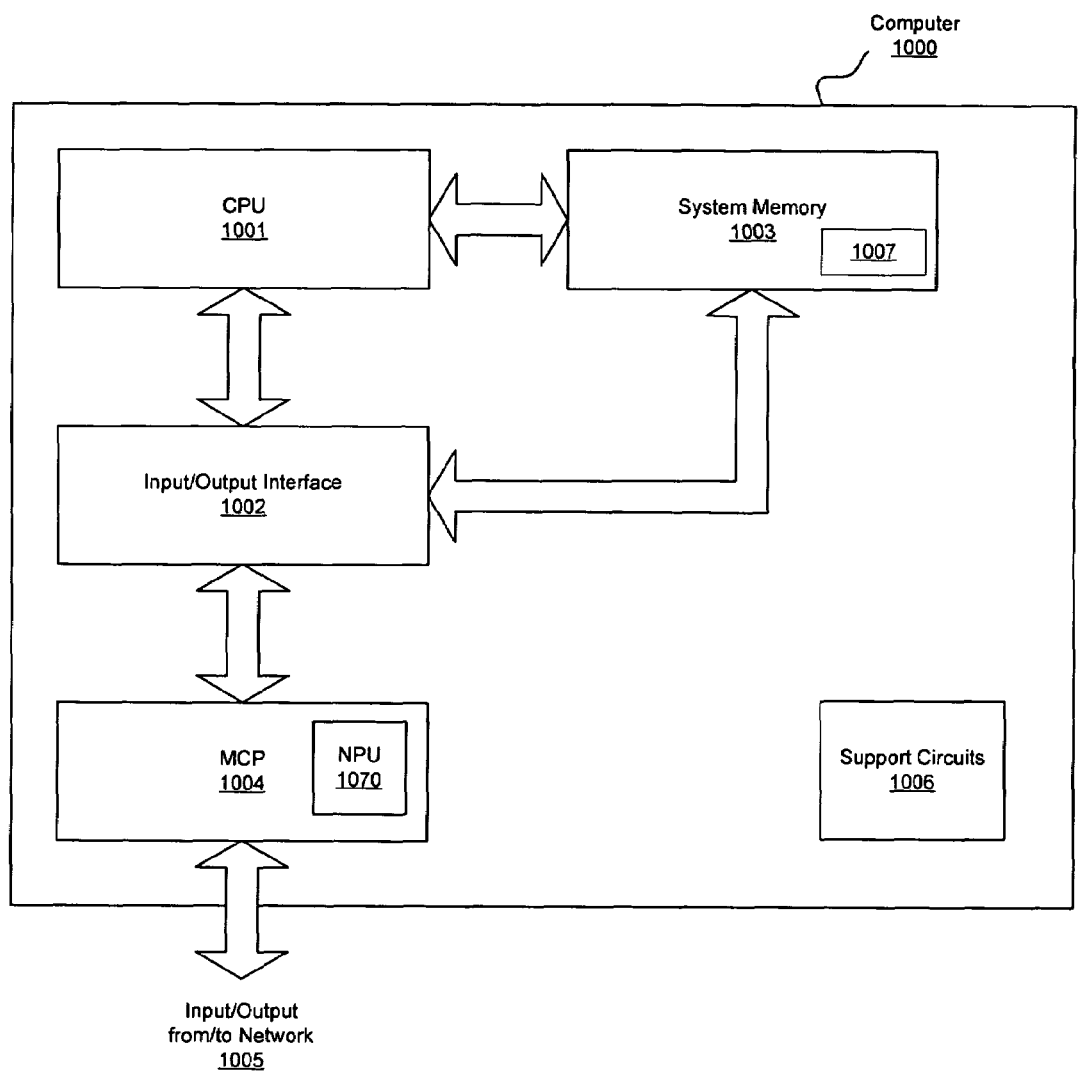
FIG. 13 is a block diagram of an exemplary embodiment of a computer system.

Referring to FIG. 13, there is shown a block diagram of an exemplary embodiment of a computer system 1000 having an NPU 1070. Computer system 1000 comprises CPU 1001, system memory 1003, a variety of support circuits 1006, I/O interface 1002, and media communications processor ("MCP") 1004, all of which are coupled via a plurality of buses. MCP 1004 includes NPU 1070. MCP 1004 may be coupled for I/O from/to a network 1005. CPU 1001 may be any type of microprocessor known in the art. Support circuits 1006 for computer system 1000 include conventional cache, power supplies, clock circuits, data registers, I/O interfaces, and the like. Memory 1003 may be directly coupled to CPU 1001 or coupled through I/O interface 1002, and I/O interface 1002 may be coupled to a conventional keyboard, network, mouse, display printer, and interface circuitry adapted to receive and transmit data, such as data files and the like.

Memory 1003 may store all or portions of one or more programs or data to implement processes in accordance with one or more aspects of the invention, including a network driver program 1007 having at least a portion of address translation flow 100. Network driver program 1007 may include NPUsoft programming. Additionally, those skilled in the art will appreciate that one or more aspects of the invention may be implemented in hardware, software, or a combination of hardware and software. Such implementations may include a number of processors independently executing various programs and dedicated hardware, such as application specific integrated circuits ("ASICs").

Programmed computer system 1000 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in memory 1003. Memory 1003 may include one or more of the following random access memory, read only memory, magneto-resistive read/write memory, optical read/write memory, cache memory, magnetic read/write memory, and the like, as well as signal-bearing media as described below.

One or more aspects of the invention are implemented as program products for use with computer system 1000. Program(s) of the program product defines functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-RAM disks readable by a CD-ROM drive or a DVD drive); or (ii) alterable information stored on writable storage media (e.g., floppy disks within a diskette drive or hard-disk drive or read/writable CD or read/writable DVD). Such signal-bearing media, when carrying computer-readable instructions that direct functions of one or more aspects of the invention represent embodiments of the invention.

Figure 14:
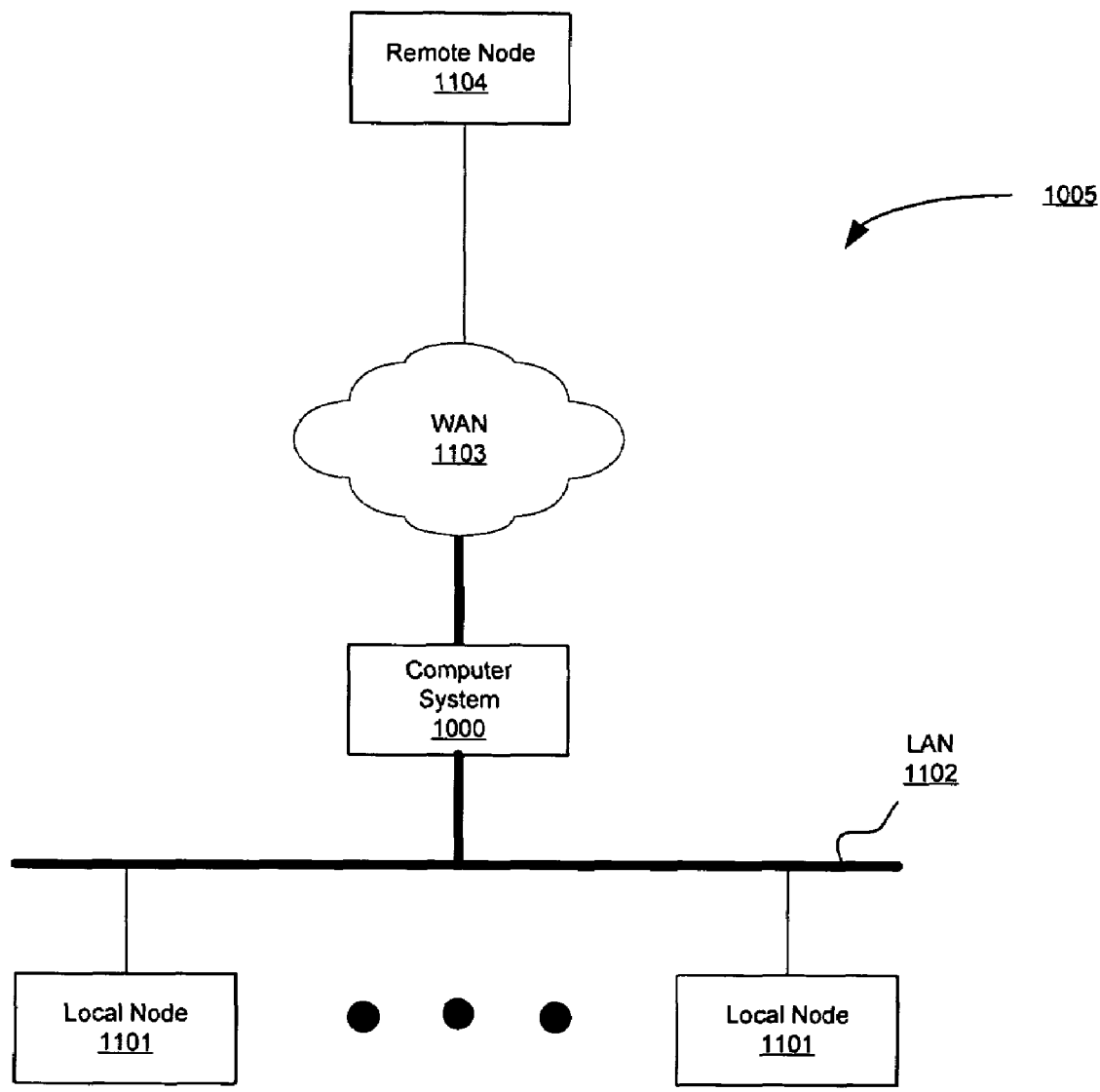
FIG. 14 is a block diagram of an exemplary embodiment of a network.

Referring to FIG. 14, there is shown a block diagram of an exemplary embodiment of a network 1005. Network 1005 includes computer system 1000 coupled local network nodes via LAN 1102 and coupled to remote network node 1104 via WAN 1103. It should be appreciated that an NPU configured with address translation as described above may be used as a gateway, having firewalling or NAT'ing, to nodes on a LAN 1102. Additionally, computer system 1000 may be a remote node 1104 with stand-a-lone firewalling or NAT'ing.

Figures 15A, 15B:
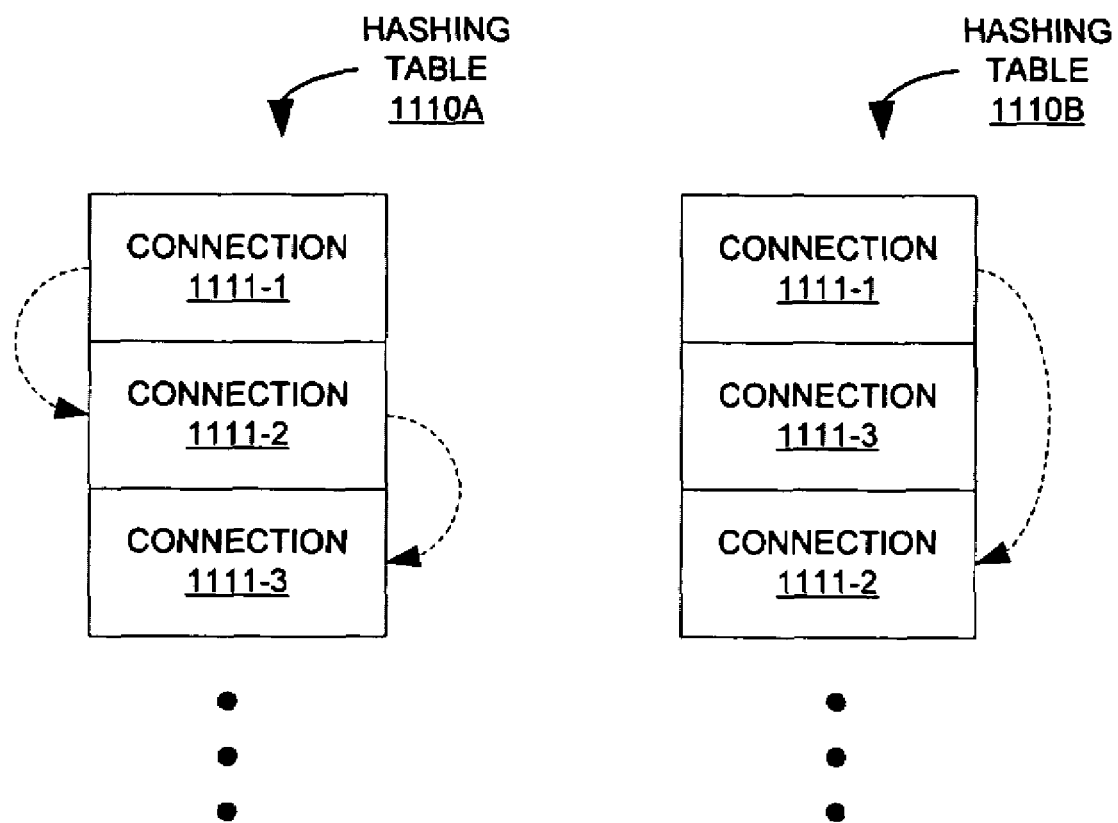
FIGS. 15A and 15B are block diagrams depicting exemplary embodiments of respective tables indexed by hash function output values.

FIGS. 15A and 15B are block diagrams depicting exemplary embodiments of respective tables indexed by hash function output values 1110A and 1110B. In tables indexed by hash function output values 1110A, a first connection 1111-1 is established, and a hash value of a five-tuple for connection 1111-1 hashes to slot 1 in such tables indexed by hash function output values 1110A. Supposing slot 1 is empty, so slot 1 is used for connection 1111-1. Then, suppose a second connection 1111-2 is established, and a hash value of a five-tuple for connection 1111-2 also hashes to slot 1. Notably, hash chains are used to account for instances where multiple n-tuples, such as five-tuples, hash to the same value. As slot 1 is already occupied with connection 1111-1, a collision occurs. Accordingly, an empty location in hash function output values 1110A is found for connection 1111-2, which in this exemplary embodiment is slot 2. So, slot 2 is used for connection 1111-2. Now, suppose a third connection 1111-3 is established which hashes to slot 2. Accordingly, an empty location in hash function output values 1110A is found for connection 1111-3, which in this exemplary embodiment is slot 3. However, this creates a chain of length three. In other words, to get to connection 1111-3, a chain from connection 1111-1 to 1111-2 to 1111-3 is used, where at each link the packet's five-tuple is compared with the five-tuple stored in that table entry matching the hash value that was computed using the five-tuple as input. Notably, though this is a hash chain of length three, it actually is an intermingling of two hash chains, namely, a chain pointing to slot 1 with slot 1 pointing to slot 2, and a chain with slot 2 pointing to slot 3.

An alternative embodiment tables indexed by hash function output values 1110B are depicted in FIG. 15B. So, if a connection 1111-3 is established and hashes to slot 2, and slot 2 is found to be occupied, an empty slot in tables indexed by hash function output values 1110B is found, which in this exemplary embodiment is slot 3. Instead of putting connection 1111-3 into slot 3 and pointing slot 2 to slot 3, as done in tables indexed by hash function output values 1110A, contents of slot 2 are moved to slot 3. Moving contents of slot 2 to slot 3, empties slot 2 for connection 1111-3, as shown. As connection 1111-3 hashed to slot 2, no other slot points to slot 2, and slot 1 now points to slot 3. Thus, there are two chains, namely, one of length two and one of length one. This reduces the length of a hash chain over that shown in FIG. 15A. Other advantages include improved performance with respect to length in which a hash chain has to be followed prior to arriving at a target connection, and reduced or eliminated of intermingling of hash chains. With respect to the last advantage, only one chain is needed to get to any of connections 1111 in tables indexed by hash function output values 1110B, namely, a chain pointing to slot 1 with slot 1 point to slot 3, or a chain pointing to slot 2.

Figures 16, 17:
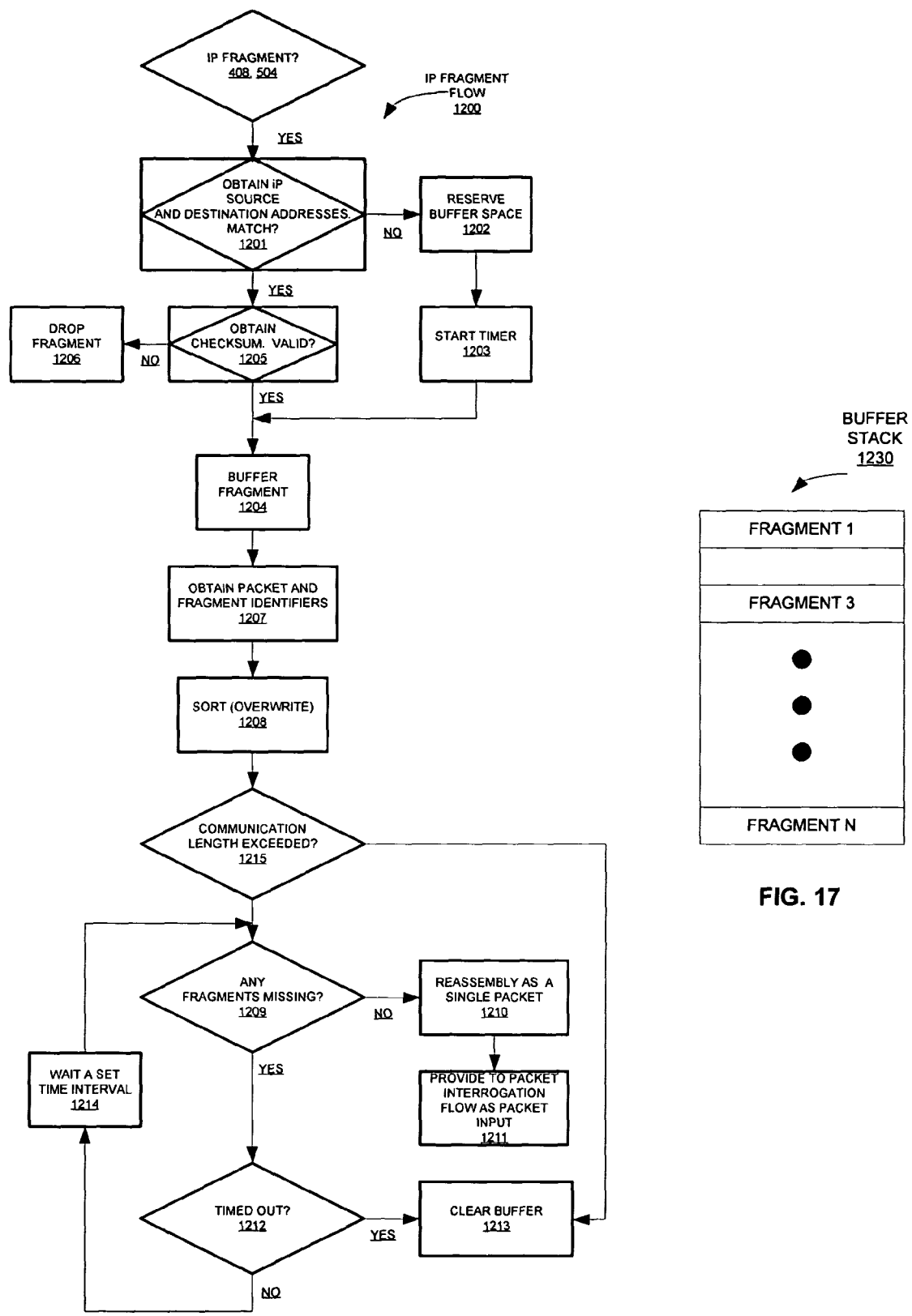
FIG. 16 is a flow diagram of an exemplary embodiment of a fragment processing flow.
FIG. 17 is a block diagram of an exemplary embodiment of a buffer stack.

FIG. 16 is a flow diagram of an exemplary embodiment of a fragment processing flow 1200. If at 408 or 504 then an associated error condition is identified for processing with software at 1201, as follows. So, if an IP fragment is received, then at 1201, IP information, for example IP packet identification (conventionally a two-bit packet identifier) and IP source and destination addresses, is obtained from such a fragment. At 1201, a check is made to determine if another IP fragment, based on such IP information obtained, is already stored in buffer space, such as in memory 1013 or 1003. If there is no match of IP information, then at 1202 buffer space is reserved, for example in memory 1013 or 1003. Additionally, a timer is started at 1203 responsive to a first received fragment for a fragmented packet. If there is a match at 1201, then at 1205, a checksum, namely, a checksum for a packet undergoing re-assembly, for a received fragment is obtained and compared against a checksum of another fragment. If the obtained checksum is invalid, then such a fragment is dropped at 1206.

If a checksum for a fragment is valid at 1205 or is a first fragment received for a fragmented packet, then at 1204 such a fragment is buffered or otherwise stored, such as in memory 1013 or 1003. Accordingly, if IP information for this fragment matches that of a previously buffered fragment, then this newly received fragment is buffered in association with a buffer stack for a fragmented packet already in process for reassembly. This may be a physical or a logical association in memory for association on a fragmented packet basis. FIG. 17 is a block diagram of an exemplary embodiment of a buffer stack 1230. If, however, IP information for this fragment does not match that of a previously buffered fragment, then such fragment is buffered at 1204 in newly reserved buffer space as reserved at 1202.

At 1207, packet and packet fragment identifiers associated with such a received fragment are obtained therefrom. At 1208, a fragment is sorted according to packet identifier and packet fragment identifier. In other words, buffered fragments are sorted into a bin for packet of origin, and then within that bin such fragments are sorted responsive to fragment number. Notably, a later arriving fragment may have a same fragment number as a previously arrived fragment, and thus the later received fragment overwrites the previously received fragment. Furthermore, fragments may not be received in the order in which they were generated. This numerical association of packet identifier to fragment may be a physical or a logical ordering within memory. This numerical association of packet fragment identifier to fragment may be a physical or a logical ordering within memory.

At 1215, an optional check is made to determine if a threshold communication length for a summation of all packets in a buffer stack has been exceeded. If a communication length threshold has been exceed, then the buffer stack is cleared at 1213; otherwise, processing continues at 1209.

At 1209, a buffer stack is checked to determine if any fragments for a fragmented packet have as yet not been buffered. For example in buffer stack 1230, fragment 2 is as yet not buffered. The number of fragments a packet may have is indicated by fragment N for N a positive integer, and is dependent upon what protocol is being used, such as IPv4 or IPv6. If a fragment is missing, then at 1212 it is determined whether a buffer stack has timed out based on when time was started at 1203 for a first fragment for such a buffer stack. If a buffer stack has timed out, then at 1213 the buffer is cleared, meaning all fragments in such buffer are dropped. If, however, a buffer stack has not timed out, then at 1214 a set time interval is used as a wait period before checking again at 1209 as to whether any fragments are still missing. Such a wait period will depend on implementation and availability of memory. Also, the number of fragments received to a destination is dependent upon likelihood of routing through an interface not able to handle full size packets.

If, however, at 1209 no fragments for a fragmented packet are missing from a buffer stack, then at 1210 such fragments are assembled into a single packet, namely, a reassembled packet. At 1211, such a reassembled packet is re-inserted into the above-described process, such as a packet 101 into packet interrogation flow 120 for further processing, including any firewalling. Thus, it should be appreciated that packet fragment assembly is done prior to screening, namely, in front of a firewall.

Notably, though IP fragment flow has been described in terms of software, it may be instantiated in hardware or both hardware and software. For example, hardware includes combinatorial logic forming a portion of an NPU. Hardware may have a performance advantage over software but at additional cost. Furthermore, while a personal computer environment has been described, a dedicated firewall computer may be used. Additionally, one or more aspects may be employed in a personal data assistant (PDA), a web-enabled phone, and other devices used for Internet communication.

Accordingly, it is worth mentioning that if NAT is used, NAT need be done only once per packet. This is facilitated by having NAT proximal to front end packet processing. Furthermore, it should be appreciated that by doing NAT, and implicit routing table lookup is done.

Additionally, it should be appreciated that if firewalling is used, firewalling need be done only once per packet. This is facilitated by having firewalling proximal to back end packet processing.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. For example, it is not necessary to incorporate an NPU as described, as a software embodiment may be used. Furthermore, the NPU architecture described herein is not the only architecture that may be used. Additionally, rather than a personal computer, a firewall computing device may be used. Claim(s) listing steps do not imply any order of the steps. Trademarks are the property of their respective owners.

The invention claimed is:

1. A method for assembling a plurality of packet fragments into a packet for transmission by network interface circuitry, the method comprising:

determining at the network interface circuitry that received data is a first packet fragment associated with a first packet;

storing the first packet fragment in a reserved buffer space in memory corresponding to the first packet, wherein the reserved buffer space stores one or more different packet fragments associated with the first packet;

determining that the first packet fragment is valid by matching a first checksum included in the first packet fragment with a second checksum included in a second packet fragment stored in the reserved buffer space;

sorting the one or more different packet fragments stored in the reserved buffer space based on a fragment number associated with each packet fragment;

determining, at a predetermined time interval, that the one or more different packet fragments associated with the first packet stored in the reserved buffer space constitute all packet fragments associated with the first packet;

combining the one or more different packet fragments associated with the first packet stored in the reserved buffer space to generate the first packet; and transmitting the first packet from the network interface circuitry over a network to a receiver.

2. The method, according to claim 1, further comprising the steps of:

storing the first packet in a buffer accessible by the network interface circuitry;

incrementing a counter of the network interface circuitry;

determining that a connection table entry associated with the first packet does not exist in the connection table;

transmitting the first packet to network interface software for preparing the first packet for the network interface circuitry;

clearing the first packet from the buffer; and decrementing the counter.

3. The method, according to claim 2, wherein the first packet is a Voice Over Internet Protocol formatted packet or a User Datagram Protocol formatted packet.

4. The method, according to claim 2, further comprising the step of generating a total count signal from the buffer, wherein the total count signal indicates to the network interface circuitry whether all the packets sent to the network interface software for processing have been at least partially processed.

5. The method, according to claim 2, wherein preparing the first packet for the network interface circuitry includes the steps of:

generating an address resolution table (ART) index for an address resolution table entry based on information stored in the first packet, wherein the address resolution table entry stores a media access control (MAC) address and MAC layer attributes associated with the first packet;

building the connection table entry that stores the ART index;

processing, at least in part, the first packet; and transmitting the first packet to the network interface circuitry.

6. The method, according to claim 5, further comprising the step of setting a do not use flag for the connection table entry, wherein the packets subsequent to the first packet are transmitted to the network interface software for processing responsive to the do not use flag.

7. The method, according to claim 5, wherein the first packet is completely processed by the network interface software.

8. The method, according to claim 5, further comprising the step of completing the processing of the first packet with the network interface circuitry.

9. A computer readable medium storing instructions for causing a network interface to assemble a plurality of packet fragments into a packet for transmission by a network interface, by performing the steps of:

determining at the network interface that received data is a first packet fragment associated with a first packet;

storing the first packet fragment in a reserved buffer space in memory corresponding to the first packet, wherein the reserved buffer space stores one or more different packet fragments associated with the first packet;

determining that the first packet fragment is valid by matching a first checksum included in the first packet fragment with a second checksum included in one of the one or more different packet fragments;

sorting the one or more different packet fragments stored in the reserved buffer space based on a fragment number associated with each of the packet fragments;

determining, at a predetermined time interval, that the one or more different packet fragments associated with the first packet stored in the reserved buffer space constitute all packet fragments associated with the first packet;

combining the one or more different packet fragments associated with the first packet stored in the reserved buffer space to generate the first packet; and transmitting the first packet from the network interface over a network to a receiver.

10. The computer readable medium, according to claim 9, wherein no packet fragments are missing at the end of the time period, and further comprising the steps of:

storing the first packet in a buffer accessible by the network interface circuitry;

incrementing a counter of the network interface circuitry;

determining that an entry associated with the first packet does not exist in the connection table;

transmitting the first packet to network interface software for preparing the first packet for the network interface circuitry;

clearing the first packet from the buffer; and decrementing the counter.

11. The computer readable medium, according to claim 10, further comprising the step of generating a total count signal from the buffer, wherein the total count signal indicates to the network interface circuitry whether all the packets sent to the network interface software for processing have been at least partially processed.

12. The computer readable medium, according to claim 10, wherein the first packet is a Voice Over Internet Protocol formatted packet or a User Datagram Protocol formatted packet.

13. The computer readable medium, according to claim 10, wherein preparing the first packet for the network interface circuitry includes the steps of:

generating an address resolution table (ART) index for an address resolution table entry based on information stored in the first packet, wherein the address resolution table entry stores a media access control (MAC) address and MAC layer attributes associated with the first packet;

building the connection table entry that stores the ART index;

processing, at least in part, the first packet; and transmitting the first packet to the network interface circuitry.

14. The computer readable medium, according to claim 13, further comprising the step of setting a do not use flag for the connection table entry, wherein the packets obtained after creation of the connection table entry are sent to the network interface software responsive to the do not use flag being set.

15. The computer readable medium, according to claim 13, wherein the first packet is completely processed by the network interface software.

16. A system for assembling a plurality of packet fragments into a packet for transmission from a network interface, the system comprising:

a central processing unit;

a system memory coupled to the central processing unit; and the network interface coupled to the system memory and the central processing unit, the network interface configured to:

determine at the network interface that received data is a first packet fragment associated with a first packet, store the first packet fragment in a reserved buffer space in a network interface local memory corresponding to the first packet, wherein the reserved buffer space stores one or more different packet fragments associated with the first packet, determine that the first packet fragment is valid by matching a first checksum included in the first packet fragment with a second checksum included in a second packet fragment stored in the reserved buffer space, sort the one or more different packet fragments stored in the reserved buffer space based on a fragment number associated with each of the packet fragments, determine, at a predetermined time interval, that the one or more different packet fragments associated with the first packet stored in the reserved buffer space constitute all packet fragments associated with the first packet, combining the one or more different packet fragments associated with the first packet stored in the reserved buffer space to generate the first packet, and transmit the first packet from the network interface over a network to a receiver.

17. The system, according to claim 16, wherein at least one packet fragment is missing at the end of the time period, and the network interface further configured to clear the reserved buffer space corresponding to the first packet.

18. The system, according to claim 16, wherein no packet fragments are missing at the end of the time period, and the network interface further configured to:

store the first packet in a buffer accessible by the network interface, increment a counter of the network interface circuitry;

determine that an entry associated with the first packet does not exist in the connection table;

transmit the first packet to network interface software for preparing the first packet for the network interface;

clear the first packet from the buffer; and decrement the counter.

19. The system, according to claim 18, wherein the network interface is further configured to generate a total count signal from the buffer, wherein the total count signal indicates to the network interface circuitry whether all the packets sent to the network interface software for processing have been at least partially processed.

20. The system, according to claim 18, wherein the network interface software is configured to:

generate an address resolution table (ART) index for an address resolution table entry based on information stored in the first packet, wherein the address resolution table entry stores a media access control (MAC) address and MAC layer attributes associated with the first packet;

build the connection table entry that stores the ART index;

process, at least in part, the first packet; and transmit the first packet to the network interface circuitry.

* * * * *